(12) United States Patent
Ishiguro et al.

(10) Patent No.: US 7,039,519 B2
(45) Date of Patent: May 2, 2006

(54) VEHICLE WEIGHT ESTIMATING DEVICE

(75) Inventors: Toshiaki Ishiguro, Chita (JP); Naoki Yamada, Aichi-ken (JP); Toshinori Murahashi, Chiryu (JP); Hiroaki Kato, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 11 days.

(21) Appl. No.: 10/809,549

(22) Filed: Mar. 26, 2004

(65) Prior Publication Data

US 2005/0010356 A1    Jan. 13, 2005

(30) Foreign Application Priority Data

Mar. 28, 2003  (JP)  .............................. 2003-092885

(51) Int. Cl.
    *G06F 17/10*    (2006.01)

(52) U.S. Cl. ..................................... 701/124

(58) Field of Classification Search ................ 701/70, 701/74, 79, 87, 65, 99, 124; 702/141, 199, 702/173–175, 189–195
See application file for complete search history.

(56) References Cited

U.S. PATENT DOCUMENTS 6,044,317 A * 3/2000 Taffin .......................... 701/57
6,339,749 B1 * 1/2002 Rieker et al. ............... 702/173

FOREIGN PATENT DOCUMENTS

JP    2002-340660 A    11/2002

* cited by examiner

*Primary Examiner*—Thu V. Nguyen
(74) *Attorney, Agent, or Firm*—Buchanan Ingersoll PC

(57) ABSTRACT

A vehicle weight estimating device includes an acceleration detecting portion, a driving force estimating, a filtered acceleration obtaining means portion for eliminating a low frequency component from the detected acceleration, a filtered driving force obtaining portion for eliminating a low frequency component from the estimated driving force, an acceleration integrating portion for obtaining an acceleration integration, a driving force integrating portion for obtaining a driving force integration, a vehicle weight estimating for estimating the vehicle weight based on the acceleration integration and the driving force integration, a vehicle weight averaging portion for averaging the estimated vehicle weight, a limiter determining portion for setting an limiter initial value, an upper limiter and a lower limiter and setting an initial area framed by each limiter, and a vehicle weight correcting portion for correcting the vehicle weight averaged based on the initial area.

9 Claims, 17 Drawing Sheets

VEHICLE WEIGHT ESTIMATING DEVICE

This application is based on and claims priority under 35 U.S.C. § 119 with respect to Japanese Application No. 2003-092885 filed on Mar. 28, 2003, the entire content of which is incorporated herein by reference.

FIELD OF THE INVENTION

This invention generally relates to a vehicle weight estimating device for estimating a vehicle weight used for determining a shift range (e.g. first speed (first gear stage), second speed (second gear stage) or third speed (third gear stage)) of an automatic transmission of the vehicle.

BACKGROUND OF THE INVENTION

A known shift controlling device of an automatic transmission of the vehicle determines a shift range based on a throttle valve opening of an engine depending on a vehicle speed and an operation amount of an accelerator pedal. In such configuration, a known vehicle weight estimating device estimates a vehicle weight which may be changed depending on, for example, a load or the number of passengers based on an acceleration and a driving force of the vehicle (e.g. Japanese Patent Laid-Open Publication No. 2002-340660). The estimated vehicle weight based on the acceleration and the driving force of the vehicle is used for determining the shift range of the automatic transmission. Such estimation is used for, for example, enhancing an effect of engine braking while the vehicle is running down a slope, and improving an accelerating performance while the vehicle is running up the slope. Thus, the shift range is changed depending on each running condition.

In the known vehicle weight estimating device, however, when the vehicle weight is estimated based on the acceleration obtained from the vehicle speed and the driving force obtained from a characteristic of a engine torque or a torque converter, an accuracy of the vehicle weight estimation may be greatly changed depending on an accuracy of each calculation of the acceleration and the driving force. Specifically, the accuracy of the vehicle weight estimation may be decreased because the acceleration and the driving force may be changed due to disturbance, a wheel may skid on a slippery road while acceleration, or the driving force may be changed due to a water temperature of the engine and an atmospheric pressure when the engine is driven. Thus, the accuracy of the vehicle weight estimation needs to be improved by preventing the fluctuation of the vehicle weight estimation due to aforementioned factors, and especially, there is a need to prevent the fluctuation of the vehicle weight estimation on the initial setting. The present invention therefore seeks to provide a vehicle weight estimating device for estimating the vehicle weight and improving the accuracy of the vehicle weight estimation on the initial setting.

SUMMARY OF THE INVENTION

According to an aspect of the present invention, a vehicle weight estimating device includes an acceleration detecting means for detecting an acceleration of a vehicle, a driving force estimating means for estimating a driving force of the vehicle, a filtered acceleration obtaining means for obtaining a filtered acceleration by eliminating a low frequency component from the detected acceleration, a filtered driving force obtaining means for obtaining a filtered driving force by eliminating a low frequency component from the estimated driving force, an acceleration integrating means for obtaining an acceleration integration by integrating a value corresponding to an absolute value of the filtered acceleration during a predetermined period, a driving force integrating means for obtaining a driving force integration by integrating a value corresponding to an absolute value of the filtered driving force during the predetermined period, a vehicle weight estimating means for estimating the vehicle weight based on the acceleration integration and the driving force integration, a vehicle weight averaging means for inputting the estimated vehicle weight and an estimating number of the vehicle weight and averaging the estimated vehicle weight, a limiter determining means for setting an limiter initial value, providing an upper limiter and a lower limiter passing the limiter initial value, and setting an initial area framed by the limiter initial value, the upper limiter and the lower limiter, and a vehicle weight correcting means for correcting the vehicle weight averaged based on the initial area during an initial estimation of the vehicle weight.

According to another aspect of the present invention, the upper limiter is set based on the limiter initial value and a vehicle weight maximum value to which the vehicle can be loaded, and the lower limiter is set based on the limiter initial value and a vehicle weight minimum value to which the vehicle can be unloaded.

According to still another aspect of the present invention, the averaged vehicle weight is corrected by the upper limiter or the lower limiter when the averaged vehicle weight is out of the initial area during the initial estimation.

According to further aspect of the present invention, the correction of the averaged vehicle weight based on the initial area is canceled after the estimating number becomes a predetermined estimating number.

According to still further aspect of the present invention, the initial estimation is executed within a period from the beginning of the vehicle weight estimation until the estimating number becomes the predetermined estimating number.

Furthermore, according to another aspect of the present invention, the averaged vehicle weight is corrected so as to get in the initial area.

Furthermore, according to still another aspect of the present invention, the initial value is set based on a vehicle weight maximum value and a vehicle weight minimum value.

Furthermore, according to further aspect of the present invention, the initial value is set between a vehicle weight intermediate value, which is between a vehicle weight maximum value, and a vehicle weight minimum value and the vehicle weight minimum value.

Furthermore, according to still further aspect of the present invention, the vehicle weight maximum value is a vehicle weight of the vehicle being maximum loading, the vehicle weight minimum value is a vehicle weight of the vehicle being empty.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein:

FIG. 1 illustrates a block diagram of a system of a shift controller to which a vehicle weight estimating device is applied;

FIG. 2 (A) and FIG. 2 (B) illustrate shift maps indicating transmitting lines used by an electric control device in FIG. 1 for shift-controlling;

FIG. 5 (b) illustrates a graph indicating a movement of absolute values of the values indicated in FIG. 5 (a);

DETAILED DESCRIPTION OF THE INVENTION

A preferred embodiment of the present invention will be described hereinbelow in detail with reference to the accompanying drawings.

Figure 1:
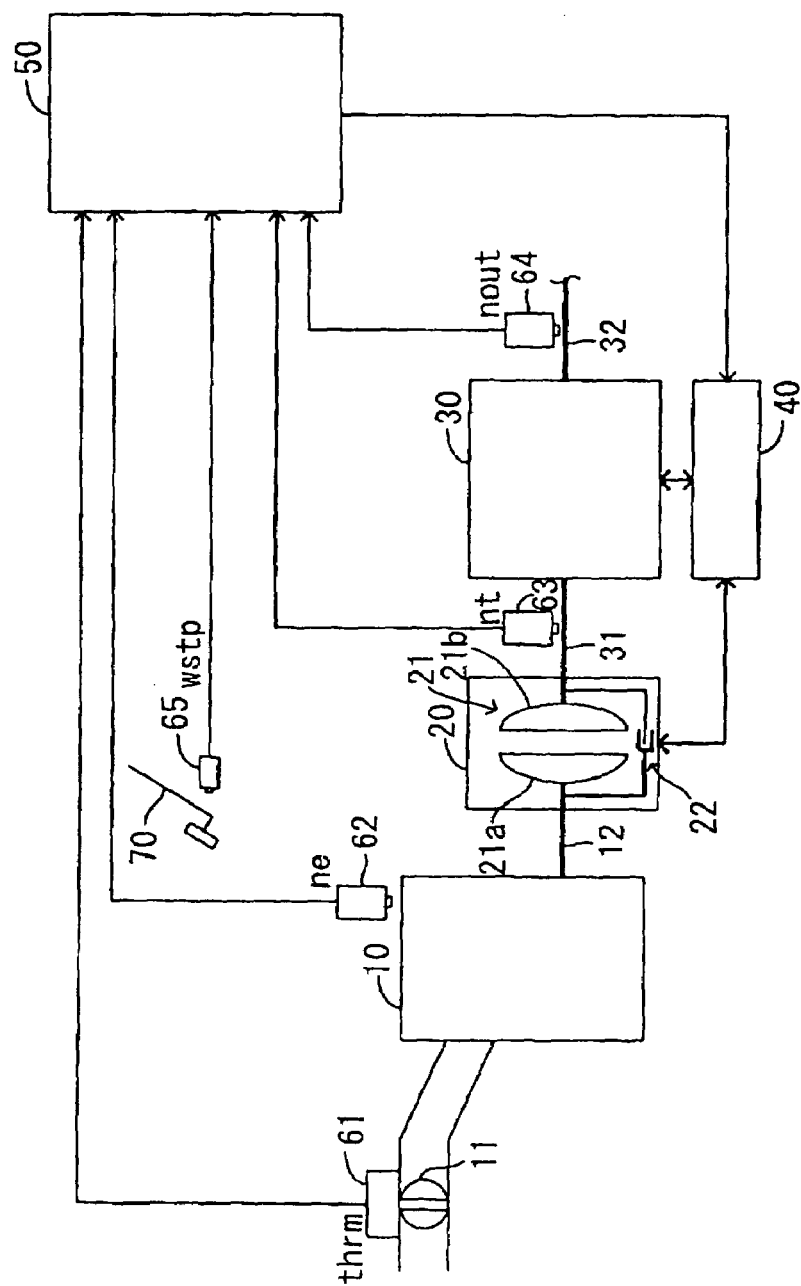

FIG. 1 illustrates a block diagram of a system of a shift controller to which a vehicle weight estimating device is applied. The vehicle includes an engine 10 as a motor, a hydraulic torque converter 20 having lock-up clutch, an automatic transmission 30 including a planetary gear unit and the like by which a shift range is selected (four shift ranges for forward movement and one shift range for rear movement), a hydraulic pressure control circuit 40 for controlling a hydraulic pressure provided to the torque converter 20 and the automatic transmission 30, and an electric control device 50 for providing a control signal to the hydraulic pressure controlling circuit 40. In the vehicle with aforementioned configuration, a torque generated at the engine 10 and controlled to be increased or decreased by the operation of the accelerator pedal (not shown) is transmitted to a drive wheel (not shown) through the torque converter 20 having the lock-up clutch, the automatic transmission 30 and a differential gear device (differential gear)(not shown).

The torque converter 20 having lock-up clutch includes a hydraulic transmitting mechanism 21 for transmitting a driving force generated at the engine 10 to the automatic transmission 30 through a hydraulic oil, and a lock-up clutch mechanism 22 connected in parallel to the hydraulic transmitting mechanism 21. The hydraulic transmitting mechanism 21 includes a pump impeller 21a connected to a torque converter input shaft 12 integrally rotating with a crank shaft (not shown) of the engine 10, a turbine impeller 21b rotated by the oil flow generated at the pump impeller 21a and connected to an input shaft 31 of the automatic transmission 30, and a stator impeller (not shown).

The lock-up clutch mechanism 22 including the lock-up clutch mechanically engages the torque converter input shaft 12 with the input shaft 30 of the automatic transmission 30 through the lock-up clutch for integrally rotating by the hydraulic pressure controlled by the hydraulic pressure controlling circuit 40, and mechanically disengages the torque converter input shaft 12 from the input shaft 30 of the automatic transmission 30 through the lock-up clutch for not transmitting the torque from the engine 10 to the automatic transmission 30.

The automatic transmission 30 including an automatic transmission input shaft 31 and an automatic transmission output shaft 32 connected to the drive wheel (not shown) of the vehicle through the differential gear unit and the like. In response to a combination of the plural hydraulic friction engaging devices moved by the hydraulic pressure controlled by the hydraulic pressure controlling circuit 40, the automatic transmission 30 selects a shift range from among plural shift ranges for forward movement (shift gear for forward movement) and a shift gear for reverse movement. The automatic transmission 30 also includes the known planetary gear unit for integrally rotating the input shaft 31 with the output shaft 32 through the aforementioned selected gear shift. At each shift ranges except the first speed (gear stage) and the second speed (at shift ranges of the third speed and the forth speed), the automatic transmission 30 becomes an inverted driving condition (engine braking condition) on which the engine 10 is driven by the driving side. On the other hand, at the first speed and the second speed, the automatic transmission 30 is controlled to not be in the inverted driving condition by actuation of the one-way clutch, or controlled to be in the inverted driving condition by stopping the actuation of the one-way clutch function by engaging the friction engaging member (not shown).

The hydraulic pressure control circuit 40 includes plural electromagnetic valves (not shown) driven to be turned on or off based on a signal from the electric control device 50. The hydraulic oil provided to the lock-up clutch mechanism 22 and the automatic transmission 30 is controlled based on a combination of actuations of such electromagnetic valves.

The electric control device 50 internally including a CPU (a.k.a. micro processor), a memory (ROM, RAM), an interface and the like is electrically connected to a throttle opening sensor 61, an engine rotation speed sensor 62, a turbine rotation speed sensor 63, an output shaft rotation speed sensor 64 and a brake switch 65, and each sensor and switch transmit signals to the electric control device 50.

The throttle opening sensor 61 provided at an inlet pass of the engine 10 detects the opening of a throttle valve 11 being opened or closed depending on the operation of the accelerator pedal (not shown) and generates a signal indicating a throttle valve opening thrm. The engine rotation speed sensor 62 detects the rotation speed of the crank shaft of the engine 10 and generates a signal indicating an engine rotation speed ne. The turbine rotation speed sensor 63 detects a rotation speed of the input shaft 31 (turbine) of the automatic transmission and generates a signal indicating a turbine rotation speed nt. The output shaft rotation speed sensor 64 detects a rotation speed of the output shaft 32 of the automatic transmission and generates a signal indicating an output shaft rotation speed (a value being in proportion to the vehicle speed) nout. The brake switch 65 outputs a brake operating signal wstp such as a high level signal (H) or a low level signal (L) in response to an operated or not operated condition of the brake pedal 70.

Figure 2A:
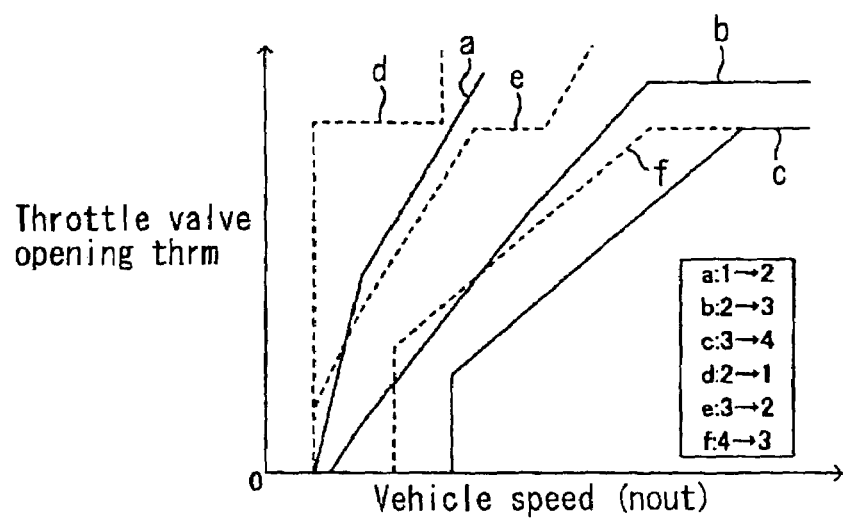
Figure 2B:
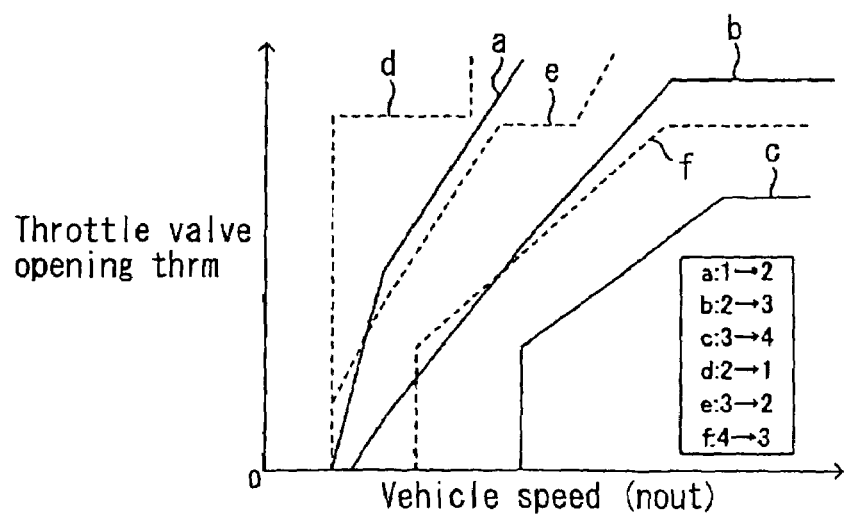

Shift control of the lock-up clutch and the automatic transmission 30 will be explained as follows. The electric control device 50 memorizes a shift map shown in FIG. 2 (A) in the memory. The shift map indicates a relationship between the output shaft rotation speed (vehicle speed) nout and the throttle valve opening thrm. When a point defined by the detected output shaft rotation speed (vehicle speed) nout and the detected throttle valve opening thrm crosses a each shift line in the shift map, the electromagnet valve of the hydraulic control circuit 40 is controlled to execute shift change being along the shift line in the shift map.

Figure 3:
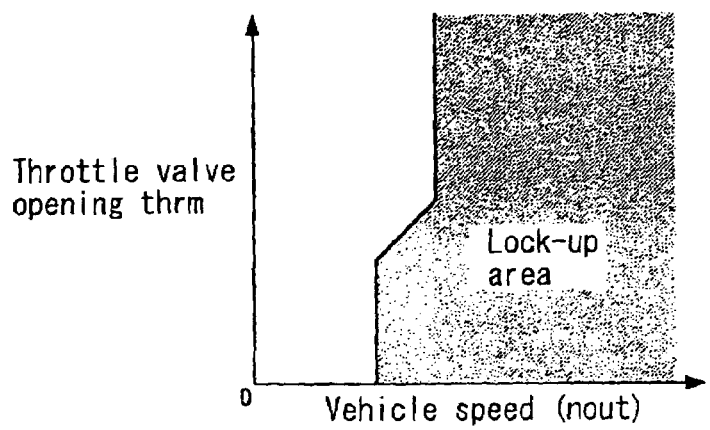
FIG. 3 illustrates a map used by the electric control device for lock-up controlling of a lock-up mechanism.

The electric control device 50 also memorizes a lock-up clutch operation map shown in FIG. 3 in the memory. The lock-up clutch operation map is determined by the output shaft rotation speed nout and the throttle valve opening thrm. When the detected output shaft rotation speed nout and the detected throttle valve opening thrm are located within an lock-up area in the lock-up clutch operation map shown in FIG. 3, the electromagnetic valve of the hydraulic controlling circuit 40 is controlled, and the lock-up clutch mechanism 22 becomes an engaging condition.

Furthermore, the electric control device 50 estimates a vehicle weight (estimated vehicle weight) m being flexible in accordance with the actual load amount or the number of the passenger. The shift change map is switched from FIG. 2 (A) to FIG. 2 (B) when the vehicle weight m is equal to or more than a predetermined value mth. In such case, a low shift range area is enhanced, and the one-way clutches at the first speed and the second speed are stopped. In this way, the effect of engine braking is enhanced.

(A basic principle of the vehicle weight estimation)

Next, an estimating means of the vehicle weight will be explained as follows. The formula 1 is a motion equation, wherein m=vehicle weight, dv=acceleration, F=driving force of the motor of the vehicle, θ=slope of the road, g=acceleration due to gravity, and R=running resistance.

$$m \cdot dv = F - m \cdot g \cdot \sin\theta - R \qquad \text{Formula 1}$$

The acceleration dv of the vehicle in the left part of the formula 1 is a derivative of the vehicle speed and calculated by a time derivative of the output shaft rotation speed nout corresponding to the vehicle speed. In this case, the acceleration dv of the vehicle is also obtained from an output from an acceleration sensor mounted to the vehicle. On the other hand, the driving force F in the right part of the formula 1 is obtained based on the torque generated at the engine 10 through the torque converter 20 and the automatic transmission 30. When the lock-up clutch is in engaging condition, the driving force F is calculated by estimating the output torque T0 from the engine 10 based on engine load such as the throttle valve opening thrm of the engine 10 and the engine rotation speed ne, and multiplying the estimated output torque T0 by a constant number of a gear ratio of the shift range k1, a gear efficiency of the shift range k2 and a gear efficiency of the differential gear mechanism k3.

In such engaging condition of the lock-up clutch, the output torque T0 from the engine 10 may be estimated accurately to some degree based on engine load such as the throttle valve opening thrm of the engine 10 and the engine rotation speed ne when the rotation of the engine is constant, however, it becomes difficult to obtain the output torque T0 precisely from the engine 10 when the rotation of the engine is transitional (not constant), for example, when the vehicle starts moving.

On the other hand, when the lock-up clutch is in disengaging condition, in other words, when the torque is controlled to be transmitted by the hydraulic transmitting mechanism 21, a output torque T0 of the torque converter 20 in response to the output torque T0 of the engine 10 is calculated by a following the formula 2. The output torque T of the torque converter 20 can be precisely obtained by the formula 2 because the formula 2 is not affected from the transitional driving condition of the engine 10.

In the formula 2, λ stands for a torque gain of the hydraulic transmitting mechanism 21 of the torque converter 20, and Cp stands for a capacity coefficient of the hydraulic transmitting mechanism 21. The torque gain λ and the capacity coefficient Cp are functions of a speed ratio e (=nt/ne), so that a products λ·Cp can be calculated from the actual speed ratio e and λ·Cp map obtained by mapping a previously calculated products λ·Cp relative to the speed ratio e. Thus, the products λ·Cp calculated based on the λ·Cp map has higher accuracy than a products λ·Cp calculated based on the torque gain λ and the capacity coefficient Cp respectively obtained from the actual speed ratio e.

$$T = \lambda \cdot Cp \cdot ne^2 \qquad \text{Formula 2}$$

The driving force F can be obtained by following the formula 3 based on the output torque T of the torque converter 20 calculated from the formula 2. In the formula 3, a constant number k stands for a product of the gear ratio of the shift range k1, the gear efficiency of the shift range k2, the gear efficiency of he differential gear mechanism k3 and a correction coefficient k4.

$$F = k \cdot \lambda \cdot Cp \cdot ne^2 \qquad \text{Formula 3}$$

In this way, dv in the left side of the formula 1 and F in the right side of the formula 1 can be calculated, however, the formula 1 still needs to prepare sin θ of the road slope for calculating the vehicle weight m (estimated vehicle weight). In this case, if the vehicle is traveling the road having a constant slope, θ becomes constant, in other words, m·g·sin θ in the formula 1 becomes constant. Thus, the effect of the slope of the road θ appears as a direct current component at the acceleration dv. In fact, the slope of the road θ changes relatively slowly, so that the effect of the slope of the road θ appears as a low frequency component being equal to or less than 2 Hz at the acceleration dv. In the formula 4, the effect due to the road slope θ is eliminated because the signal being equal to or less than a predetermined frequency (e.g. 2 Hz) is eliminated from the signals indicating the acceleration dv and the driving force F in formula 4. In the formula 4, hf stands for a filtered driving force hf obtained by eliminating the signal being equal to or less than the predetermined frequency (e.g. 2 Hz) from the signal indicating the driving force F, and hdv stands for a filtered acceleration hdv obtained by eliminating the signal being equal to or less than the predetermined frequency (e.g. 2 Hz) from the signal indicating the acceleration dv. In addition, the formula 1 considers the running resistance R, however, such resistance is not considered in the formula 4 because the running resistance R includes only low frequency component, and such low frequency component has been already eliminated from the filtered acceleration hdv and the filtered driving force hf in the formula 4 as aforementioned before.

$$hf = m \cdot hdv \quad \text{Formula 4}$$

(Area Calculation)

According to the formula 4, the vehicle weight m is calculated by dividing the filtered driving force hf by the filtered acceleration hdv. When the value of the filtered acceleration hdv is small, a percentage of a noise included in the filtered acceleration should be small as possible because such noise may lower the estimation accuracy of the vehicle weight m. To avoid such phenomena, it is preferably that the vehicle weight m is estimated based on a integration of the filtered acceleration hdv being equivalent to an average value of the filtered acceleration hdv within a certain period (interval), and a integration of the filtered driving force hf within the same certain period when the filtered acceleration hdv becomes significantly large at the time of, for example, the vehicle starts driving. In other words, the formula 4 may be changed into the formula 5 which can improve the estimating accuracy of the vehicle weight m by setting an integration period in the formula 5 as a predetermined period when the vehicle starts driving.

$$\int hf \, dt = m \cdot \int hdv \, dt \text{ (integration period } t = t1 \sim t2) \quad \text{Formula 5}$$

Figure 4:
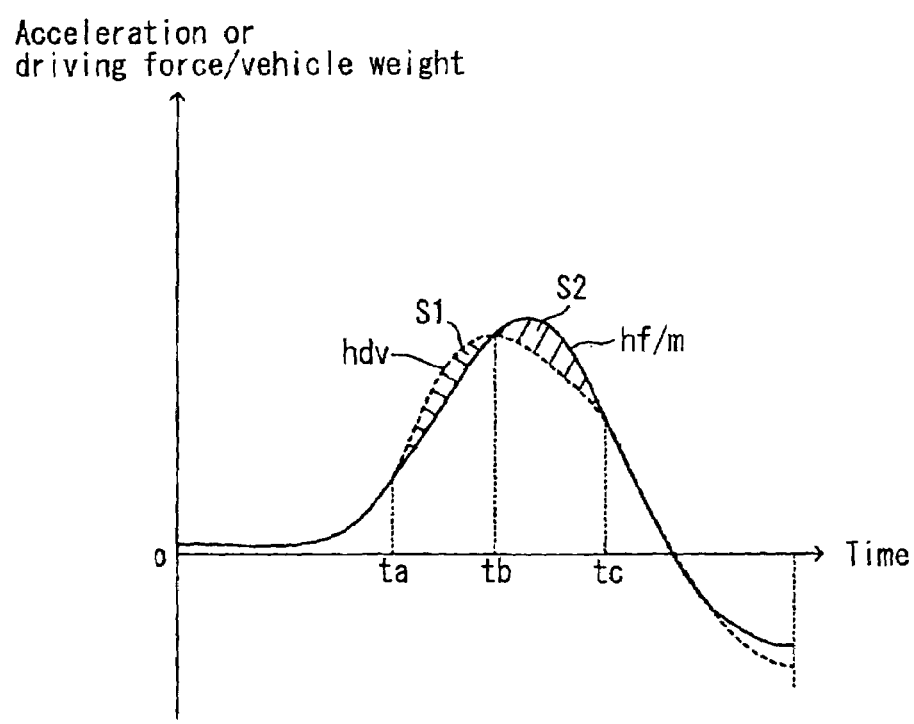
FIG. 4 illustrates a graph indicating a filtered acceleration and a value obtained by dividing a filter driving force by a known vehicle weight when a vehicle starts traveling.

FIG. 4 illustrates a graph indicating a value obtained by dividing the filtered driving force hf by a known vehicle weight m (hf/m) in solid line, and the filtered acceleration hdv in dashed line when a vehicle starts driving at which a fluctuation of the acceleration dv due to a twist of the vehicle transmission system. A integration $Sf(=\int (hf/m) dt)$ of the value obtained by dividing the filtered driving force hf by the vehicle weight m will be an area surrounded by the solid line indicating the value obtained by dividing the filtered driving force hf by the vehicle weight m and the X-axis in FIG. 4. A integration $Sdv(=\int hdv \, dt)$ of the filtered acceleration hdv will be an area surrounded by the dashed line indicating the filtered acceleration hdv and the X-axis in FIG. 4. A method for calculating the vehicle weight based on the formula 5 is hereinafter referred to as an area calculation.

There is a phase contrast between the value obtained by dividing the filtered driving force hf by the vehicle weight m (hf/m) and the filtered acceleration hdv. Specifically, the filtered acceleration hdv is larger than the value obtained by dividing the filtered driving force hf by the vehicle weight m (hf/m) within a time length from time ta and time tb. On the other hand, the filtered acceleration hdv is smaller than the value obtained by dividing the filtered driving force hf by the vehicle weight m (hf/m) within a time length from time tb and time tc. Using the area calculation, however, the phase contrast may be eliminated because an area S1 and an area S2 shown in FIG. 4 obtained by the area calculation are approximately same, so that the estimating accuracy of the vehicle weight m can be improved.

(Integration of an Absolute Value)

According to the formula 5, the vehicle weight m is obtained by dividing the integration Sf of the filtered driving force $hf(=\int hf \, dt)$ by the integration Sdv of the filtered acceleration $hdv(=\int hdv \, dt)$. Thus, the more the integration Sdv of the filtered acceleration hdv becomes large, and a percentage of the noise included in the integration Sdv becomes small, the more the vehicle weight m can be accurately estimated. To enlarge the integration Sdv of the filtered acceleration hdv, the integration period of the filtered acceleration hdv needs to be increased (set the integration period to be longer).

Figure 5A:
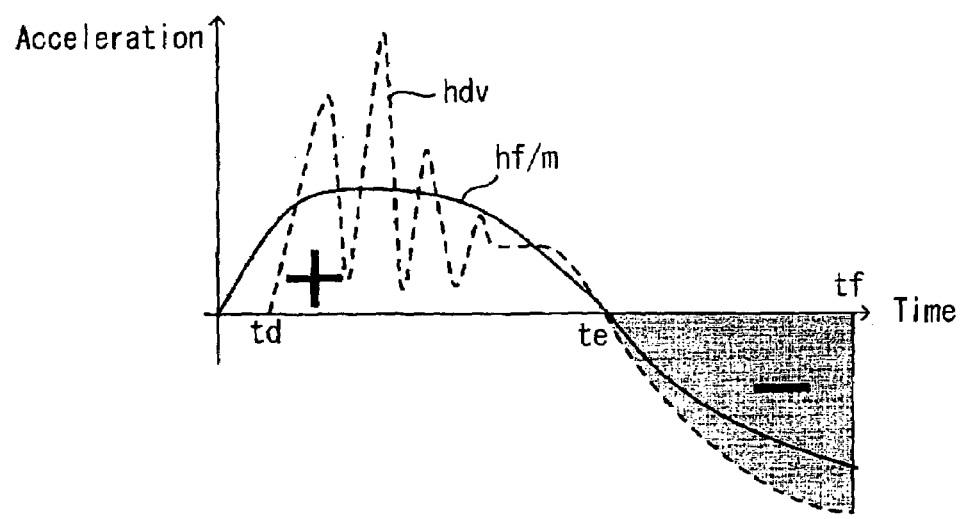
FIG. 5 (a) illustrates a graph indicating the filtered acceleration and the value obtained by dividing the filter driving force by the known vehicle weight when the vehicle starts traveling at which a significant fluctuation of an acceleration due to a twist of the vehicle transmission system is occurred.
Figure 5B:
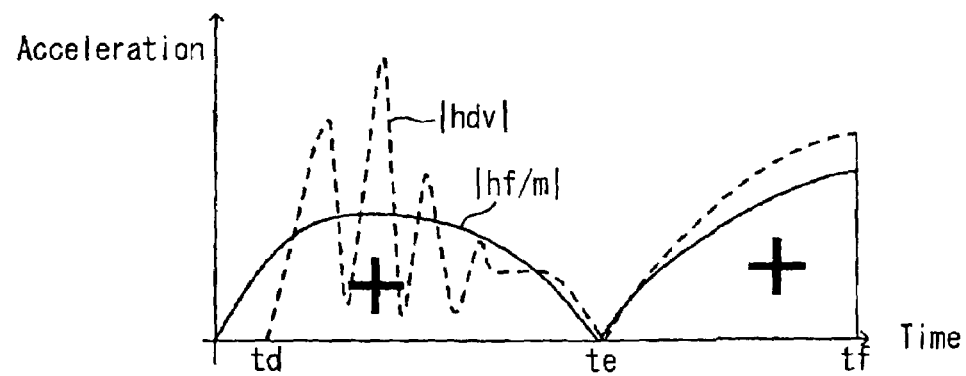

The filtered acceleration hdv at the vehicle start and the filtered driving force hf (the value obtained by dividing the filtered driving force hf by the vehicle weight m) become positive within a time length between time td and time te, and become negative on and after time te (there is the fluctuation of the acceleration dv due to a twist of the vehicle transmission system in FIG. 5 (A)). Thus when the integration period is set to be long period from time td to time tf, the pulse value balances out the plus and the minus numbers, then the integration Sf of the filtered driving force hf and the integration Sdv of the filtered acceleration hdv become smaller. It is not preferable to set the integration period to be long because the integration Sdv becomes small which result in decreasing the estimating accuracy of the vehicle weight m.

Then, absolute values will be referred on both side of the formula 4, in other words, the formula 6 is held referring to the absolute values of the formula 4. Then, the formula 7 is obtained based on the formula 6 for estimating the vehicle weight m. As shown in FIG. 5 (B), areas obtained by integration become positive at any time regardless of the plus and minus of the values of the filtered acceleration hdb and the filtered driving force hf. Thus, the integration may not be reduced even if the integration period is set to be long. According to formula 7, the integration of the filtered acceleration hdv can be larged when the integration period is long, thus estimating accuracy of the vehicle weight m can be improved.

$$|hf| = m \cdot |hdv| \quad \text{Formula 6}$$

$$\int |hf| dt = m \cdot \int |hdv| dv \text{ (integration period } t = t1 \sim t2) \quad \text{Formula 7}$$

(Introduction of Forgetting Coefficient)

The filtered acceleration hdv shown in FIG. 5 can be obtained as follows. Firstly, the acceleration signal dv is filtered through a highpass filter for eliminating the low frequency component due to the road slope θ therefrom. At the same time, such acceleration signal dv is filtered through a notch filter for eliminating a vibration component due to the twist of the vehicle transmission system and a flexibility of a suspension of the vehicle. Further, such acceleration signal dv is filtered through a lowpass filter for eliminating the sensor noise.

In this case, the actual filtered acceleration hdv is fluctuated quickly right after the vehicle starts traveling because the filtering by the notch filter is in transient state. If the filtered acceleration hdv at the right after the vehicle starts traveling is integrated, the estimating accuracy of the vehicle weight m is decreased because such value still has a lot of noises due to the twist of the vehicle transmission system.

The embodiment of the current invention introduces a method for integrating the filtered acceleration hdv and the filtered driving force hf by introducing the forgetting coefficient λ shown in the formula 8. The forgetting coefficient λ may set to be 0~1 (preferably 0.98).

$$\int \lambda^{(t2-t)}|hf|dt = m \cdot \int \lambda^{(t2-t)}|hdv|dt \text{ (integration period: } t1 \sim t2) \quad \text{Formula 8}$$

Based on the formula 8, a driving force integration can be obtained by integrating the product value of the absolute value of the filtered driving force hf (value in response to the estimated driving force) and the forgetting coefficient which is getting lager as time goes on since the integration has started. At the same time, an acceleration integration can be obtained by integrating the product value of the absolute value of the filtered acceleration hdv (value according to the estimated driving force) and the forgetting coefficient which is getting lager as time goes on since the integration has started. Then, the vehicle weight m can be obtained by dividing the driving force integration by the acceleration integration.

Figure 6:
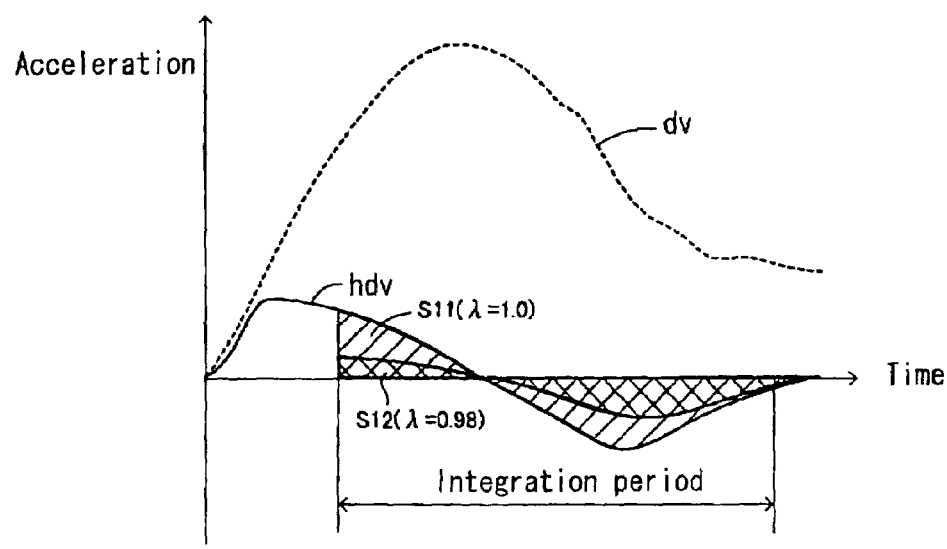
FIG. 6 illustrates a graph showing shaded areas indicating integrated results of the filtered acceleration to which different forgetting coefficient numbers are applied.

The integration $\int \lambda^{(t2-t)}|hdv|dt$ in the right side of the formula 8 is shown in an area S11 and S12 in FIG. 6. The area S11 indicates the integration $\int \lambda^{(t2-t)}|hdv|dt$ being substituted 1 for the forgetting coefficient λ (in other word, not introducing the forgetting coefficient λ). On the other hand, the area S12 indicates the integration $\int \lambda^{(t2-t)}|hdv|dt$ being substituted 0.98 for the forgetting coefficient λ. It is apparently from the areas S11 and S12 in FIG. 6 that the area of the filtered acceleration hdv (and the filtered driving force hf) having a lot of errors at the right after the vehicle starts traveling becomes small when the vehicle weight m is calculated from the formula 8 at which the forgetting coefficient is introduced, so that the vehicle weight can be obtained more precisely. Hereinafter, the left side of the formula 8 $\int \lambda^{(t2-t)}|hf|dt$ is referred to as a driving force integration SF, and the right side of the formula 8 $m \cdot \int \lambda^{(t2-t)}|hdv|dt$ is refereed to as an acceleration integration Sa.

(Correction of an Integration Staring Timing by a Speed Ratio)

As aforementioned above, it is preferable for improving the estimating accuracy of the vehicle weight m to estimate the vehicle weight m when the filtered acceleration hdv becomes large when the vehicle starts traveling. On the other hand, the speed ratio e of the torque converter obtained by dividing the turbine rotation speed nt by the engine rotation speed ne may not be influenced from the noise. Considering such character of the speed ration e, the condition when the vehicle starts driving is certainly determined based on the speed ratio e, thus the estimating accuracy of the vehicle weight can be improved.

Specifically, the condition when the vehicle starts traveling is confirmed when the throttle valve opening becomes larger than 0 (t thrm>0), the brake is not working (wstp=0), the vehicle speed is larger than 0, and the speed ratio e is lager than the predetermined value (e.g. e>0.1). When the condition that the vehicle stars traveling is confirmed, the integration can be executed.

(Improving the Estimation Accuracy by Delaying the Integration Start)

Figure 7:
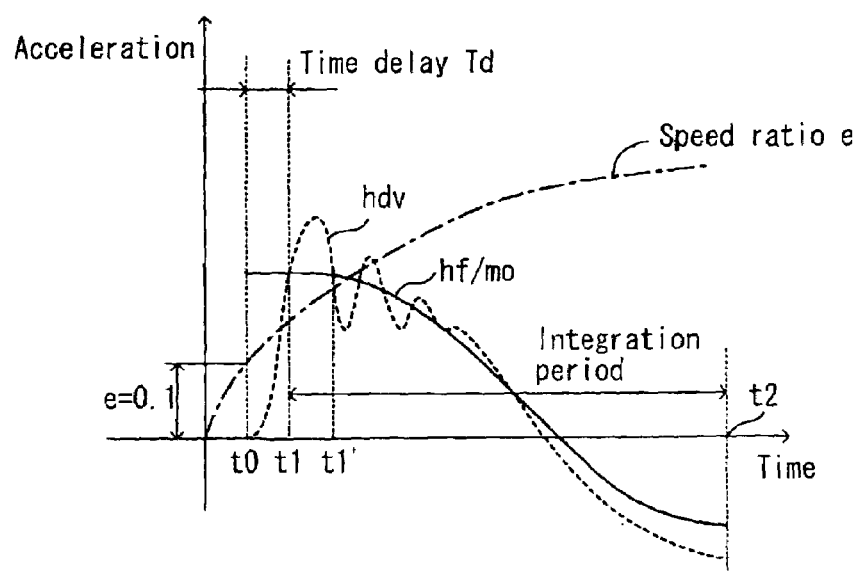
FIG. 7 illustrates a graph indicating the filtered acceleration, a value obtained by dividing the filtered driving force by a basic vehicle weight and a speed ratio.

FIG. 7 illustrates a graph indicating the filtered acceleration hdv when the vehicle starts traveling in a dashed line, a value (hf/m0) obtained by dividing the filtered driving force hf by a basic vehicle weight m0 in a solid line, and the speed ratio e in a chain line. The basic vehicle weight m0 is the weight of the vehicle loading a half of the maximum capacity loading (half-loading condition) and mounting the vehicle weight estimating device according to the current invention.

If the filtered acceleration hdv is not including vibrations, the filtered acceleration hdv changes along the value (hf/m0) obtained by dividing the filtered driving force hf by the basic vehicle weight m0. In addition, if the integration starts when it is confirmed that the vehicle starts traveling, the vehicle m may be estimated using reliable data of the acceleration dv.

As shown in FIG. 7, however, the filtered acceleration dv is changed quickly right after the vehicle start is determined (on or after the period t0~t1) based on the speed ratio e under a driving condition or the vehicle at which the acceleration dv tends to be affected by the twist of the vehicle transmission system. Such filtered acceleration hdv may reduce the estimating accuracy of the vehicle weight m.

According to the current invention, the start of the integration is delayed to the time (time t1) which the filtered acceleration hdv corresponds to the value (hf/m0) obtained by dividing the filtered driving force hf by the basic vehicle weight m0. Thus, the estimating accuracy of the vehicle weight m can be improved because the filtered acceleration hdv of low accuracy on or before the time t1 is not used for estimating of the vehicle weight m.

The basic vehicle weight m0 can be any values being equal to or more than the weight of the vehicle loading 0 load, and being equal to or less than the weight of the vehicle loading the predetermined maximum capacity loading. The integration starting time may be delayed furthermore if the acceleration integration Sa can be a sufficient large value in consideration of the integration ending time t2. In this case, a time (time t1') when the filtered acceleration hdv extends downwardly and crosses the value (hf/m0) obtained by dividing the filtered driving force hf by the basic vehicle weight m0 after extending upwardly and crossing the value hf/m0 at time t1 may be set as the integration starting time. In other words, the estimating accuracy of the vehicle weight m can be improved by not using the filtered acceleration hdv of on or before at least the time t1 for estimating the vehicle weight m.

(Correction of an Integration Ending Timing by a Speed Ratio)

As aforementioned before, the more the integration period is set to be longer, the more the accelerating integration Sa becomes larger, as a result, the estimating accuracy of the vehicle weight m can be improved. On the other hand, when the automatic transmission shifts from the first shift to the second shift after the vehicle starts traveling, the torque transmission of the automatic transmission 30 can not be estimated precisely, as a result, the estimation accuracy of the driving force F using speed ratio e will be declined. Thus, the estimating accuracy of the vehicle weight m may be declined using data during such shifting period. In other words, the integration of the filtered acceleration hd and the filtered driving force hf should be ended based on the starting time of such shifting period determined precisely.

Taking a peak value (maximum value) before the speed ratio e monotone increases after the vehicle starts traveling and is largely changed due to the shift change from the first shift to the second shift, the integration ending timing t2 is set to be the timing when the peak value of the speed ratio e is detected. Specifically, the speed ratio e may be determined as the peak value when the speed ratio e is equal to or more than the predetermined value (e.g. 0.88) and the speed ratio e indicates being on the decline for the second time in a row at a sampling timing, at this moment, the integration will be finished.

Figure 8:
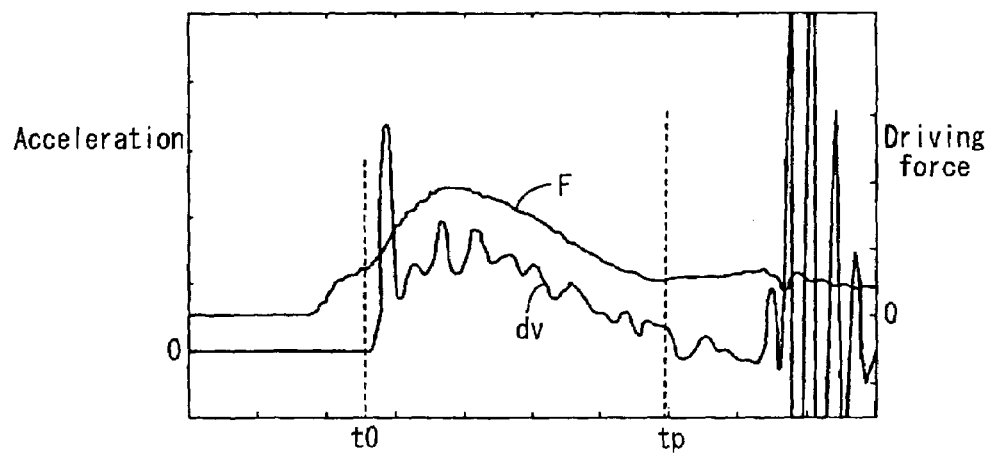
FIG. 8 (A) illustrates a graph indicating the acceleration and the driving force from the beginning of the vehicle start until the transmission is started, FIG. 8 (B) illustrates a graph indicating the speed ratio from the beginning of the vehicle start until the transmission is started.
Figure 8:
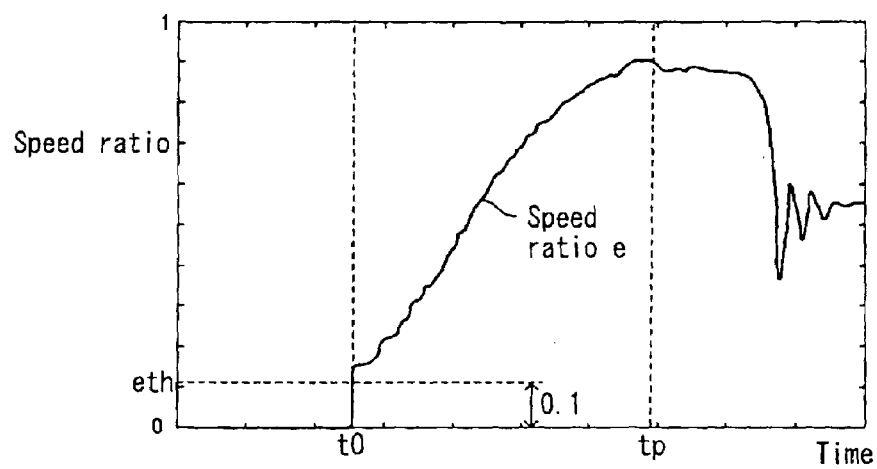

FIG. 8 (A) illustrates a graph indicating changes of the acceleration dv and the driving force F according to the passage of time when the vehicle starts traveling. FIG. 8 (B)

illustrates a graph indicating the change of the speed ratio e according to the same passage of time when the vehicle starts traveling. The estimating accuracy of the vehicle weight m can be improved setting the integration ending time of the filtered acceleration hdv and the filtered driving force hf at a time tp when the speed ratio e becomes the peak value as shown in FIG. 8 (B) because the filtered driving force hf on or after the time tp being not accurate will be excluded from the data used for integration.

(Actual Operation)

Next, an operation of the electric controlling device 50 for estimating the vehicle weight m based on the aforementioned principle will be explained referring to FIG. 9 through FIG. 17. FIG. 9 through FIG. 17 is function block diagrams indicating the operations executed by the CPU of the electric controlling device 50. Each signal thrm, wstp, nt, ne and nout is transmitted from each sensor or switch 61 through 65, and signal sift indicates the actual shift range of the automatic transmission 30 (hereinafter referred to as a shift range signal sift) being recognized by the CPU through the aforementioned transmitting controlling program.

(Process)

Figure 9:
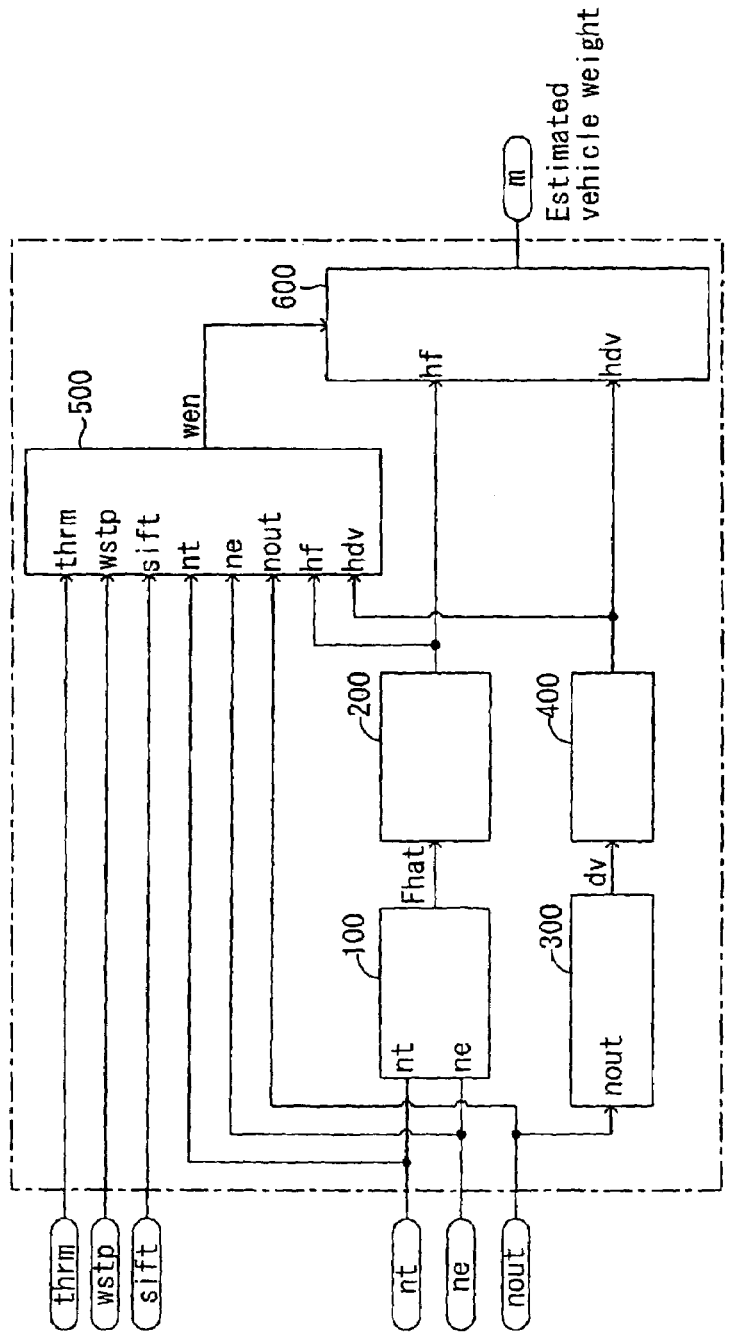
FIG. 9 illustrates a functional block diagram of a process of the vehicle weight estimation by the microcomputer of the electric control device shown in FIG. 1.

As shown in FIG. 9, the process executed by the CPU including, an estimating driving force calculating portion 100 for calculating an estimated driving force signal Fhat based on the turbine rotation speed nt and the engine rotation speed ne, a filtering process portion of the driving signal 200 for calculating the filtered driving force hf by filtering the estimated driving force signal Fhat, an acceleration calculating portion 300 for calculating the accelerating signal dv based on the output shaft rotation speed nout, a filtering process portion of the acceleration 400 for calculating the filtered acceleration hdv by filtering the accelerating signal dv, an integration permitting portion 500 for determining the integration period (the integration starting timing t1 and the integration ending timing t2) , and an area comparing portion 600 for estimating the vehicle weight m from the formula 8. The process will be explained as follows.

(Estimated Driving Force Calculating Portion)

Figure 10:
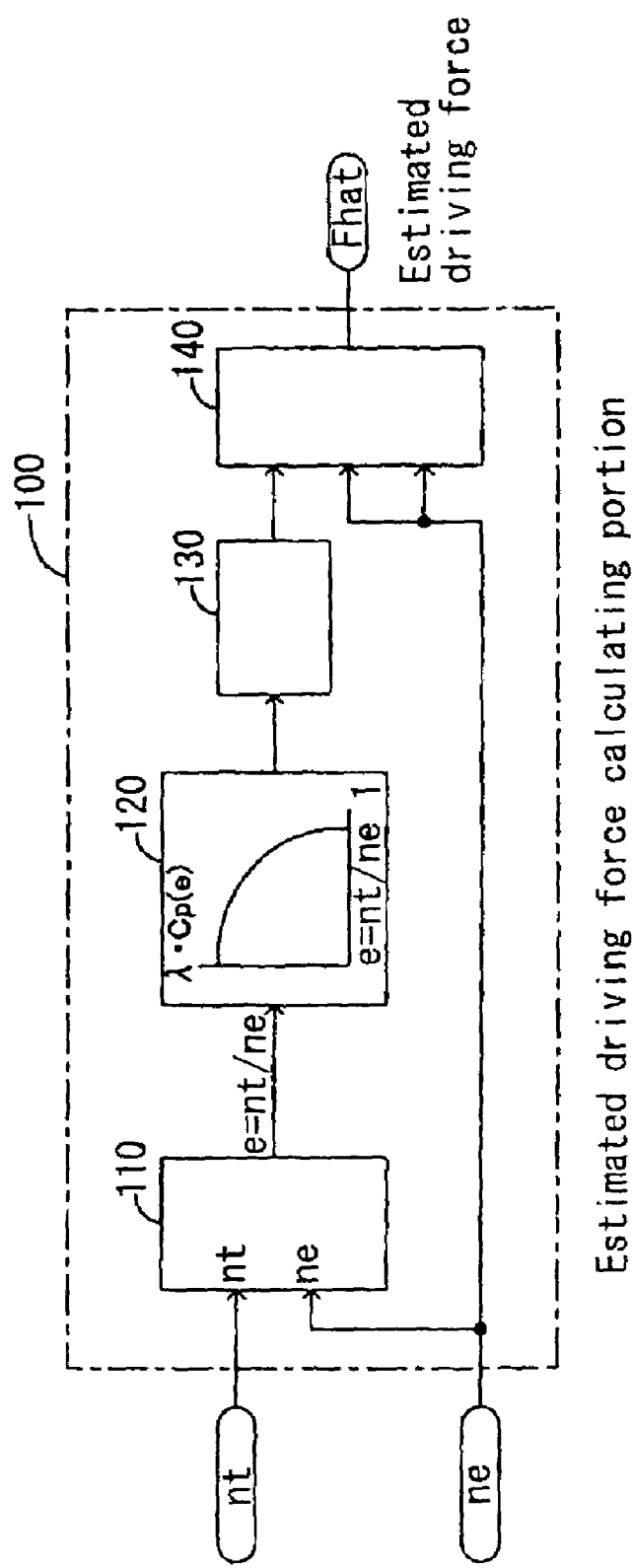
FIG. 10 illustrates a functional block diagram of an estimated driving force calculating portion shown in FIG. 9.
Figure 11:
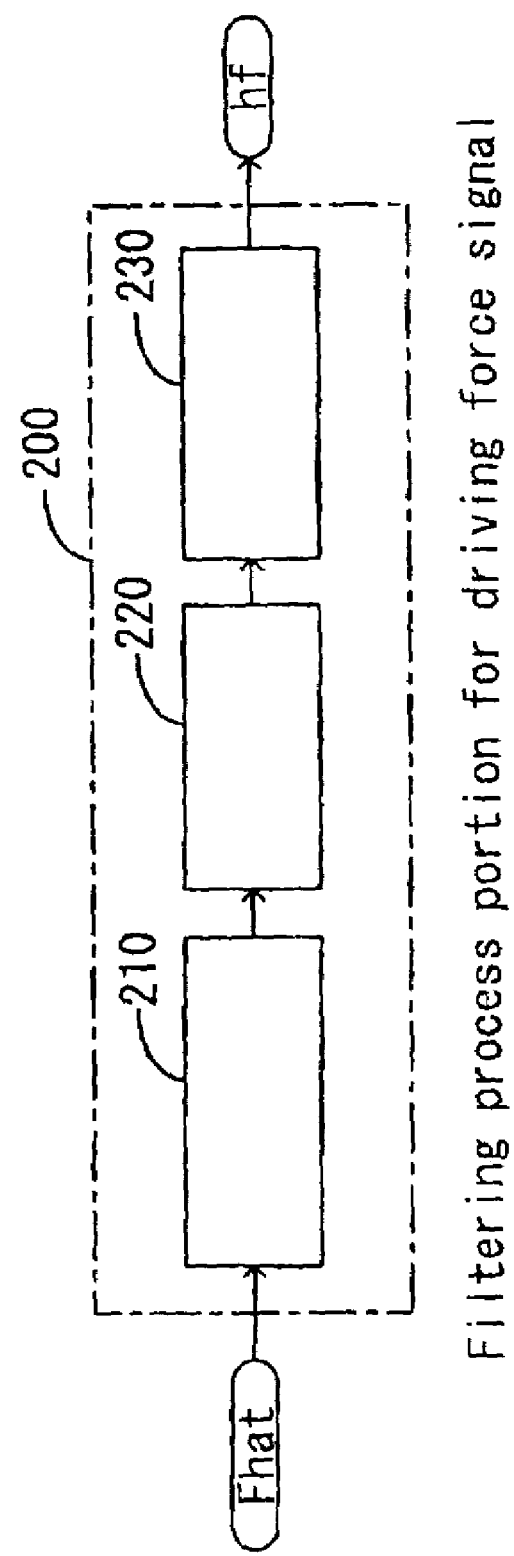
FIG. 11 illustrates a functional block diagram of a filtering portion of a driving signal shown in FIG. 9.
Figure 12:
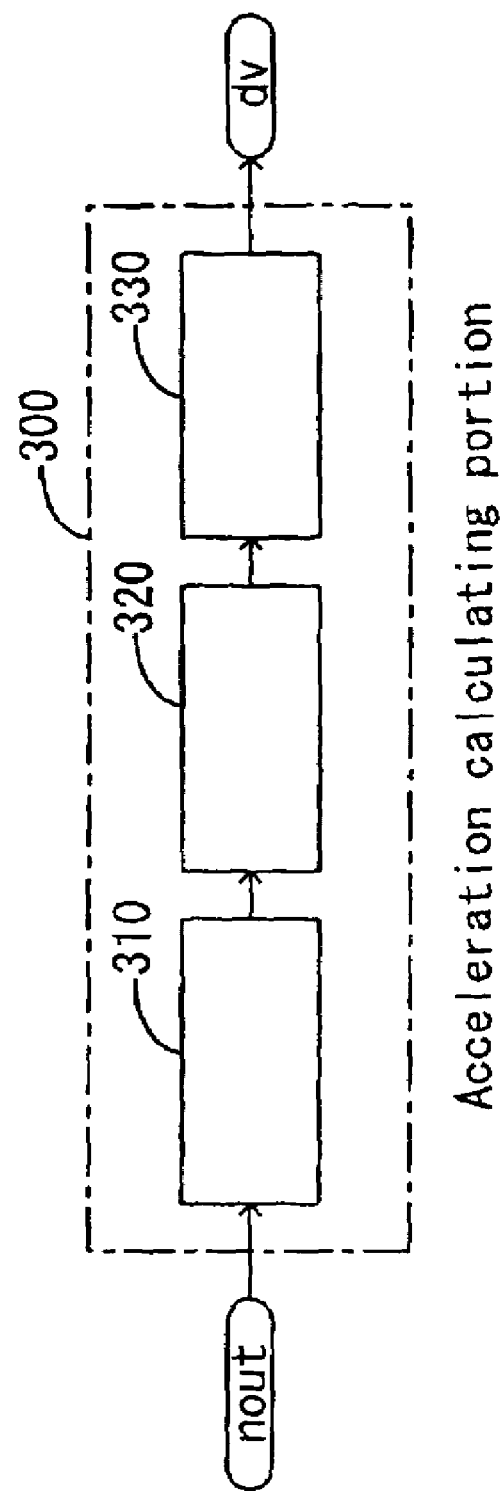
FIG. 12 illustrates a functional block diagram of an acceleration calculating portion shown in FIG. 9.

The CPU executes the operation of the estimated driving force calculating portion 100 shown in FIG. 10 with respect to each predetermined time ts (e.g. each 20 msec) for calculating the estimated driving force signal Fhat. Specifically, the CPU inputs the turbine rotation speed nt and the engine rotation speed ne at the division portion 110. At the division portion 110, the speed ratio e (=nt/ne) is obtained by dividing the turbine rotation speed nt by the engine rotation speed ne.

Next, the CPU calculates the actual products $\lambda \cdot Cp$ (e) at a block 120 from the actual speed ratio e obtained at the division portion 110 and the map indicating the relationship between the speed ratio e and the products $\lambda \cdot Cp$ ($\lambda \cdot Cp$ map). The $\lambda \cdot Cp$ map is made in advance based on an experiment and the like and memorized in the ROM. The $\lambda \cdot Cp$ map is determined by measuring the actual products $\lambda \cdot Cp$ relative to the actual speed ratio e when the shift range of the automatic transmission 30 is fixed at the first shift, and the vehicle weight is changed at various values by changing the load amount thereof. The actual products $\lambda \cdot Cp$ is calculated based on the actual output torque T0 of the engine 10 (measured at the torque sensor), the actual engine rotation speed ne (measured at the engine rotation speed sensor) and the formula 2.

Then, the CPU calculates $k \cdot \lambda \cdot Cp$ by multiplying the actual products $\lambda \cdot Cp$ obtained at the block 120 by the constant number k indicated in the formula 3. The constant number k is obtained by multiplying a products of the gear ratio of the shift range k1, the gear efficiency of the shift range k2, and the gear efficiency of the differential gear mechanism k3 by a predetermined correction coefficient k4. At the driving force calculating portion 140, the CPU calculates the driving force F by multiplying $k \cdot \lambda \cdot Cp$ by $ne^2$ obtained by squaring the engine rotation speed ne ($=k \cdot \lambda \cdot Cp \cdot ne^2$), and outputs the driving force F as the estimated driving force signal Fhat.

(Filtering Process Portion for the Driving Force Signal)

The filtering process portion of the driving force signal 200 inputs the estimating driving force signal Fhat and calculates the filtered driving force hf through various filtering process. Specifically, the filtering process portion 200 inputs the estimated driving force signal Fhat in the lowpass filter 210 and eliminates a high frequency noise being more than or equal to the first cut-off frequency f1 included in the estimated driving force signal Fhat. Such high frequency noise mainly results from the engine rotation number ne used for obtaining the estimating driving force signal Fhat and the sensor noise included in the turbine rotation speed ne. Then, the output from the lowpass filter 210 is input into the notch filter 220. The notch filter 220 eliminates a frequent component between the second cut-off frequency f2 being less than the first cut-off frequency f1 and the third cut-off frequency f3 being less than the second cut-off frequency f2.

Next, the output from the notch filter 220 is input into the highpass filter 230. The highpass filter 230 eliminates a frequent component being equal to or less than the forth cut-off frequent f4 around 1~2 Hz and being less than the third cut-off frequency f3. The highpass filter 230 is used for eliminating an effect from the slope of the load θ. Through the aforementioned operations, the filtered driving force hf is obtained at the filtering process portion of the driving signal 200.

(Acceleration Calculating Portion)

The CPU executes the process of the accelerating calculating portion 300 with respect to each predetermined time ts (e.g. 20 msec) to obtain the acceleration dv. Specifically, the CPU inputs the output shaft rotating speed nout into the lowpass filter 310 for eliminating the sensor noise included in the output rotating shaft nout.

Then, the output from the lowpass filter 310 is input into the derivation process portion 320. In the derivation process portion 320, the output shaft rotating speed nout is actually time differentiated by calculating a differential between a current output shaft rotation speed nout (output from the lowpass filter 310) and an output shaft rotation speed nout (output from the lowpass filter 310) of the predetermined time td before. Thus, a signal dn in response to each vehicle acceleration can be obtained. The signal dn is input into the acceleration calculating portion 330, and the acceleration signal dv is calculated by multiplying the signal dn by an predetermined constant number and converting the rotation speed into the acceleration.

(Filtering Process Portion for the Acceleration Signal)

Figure 13:
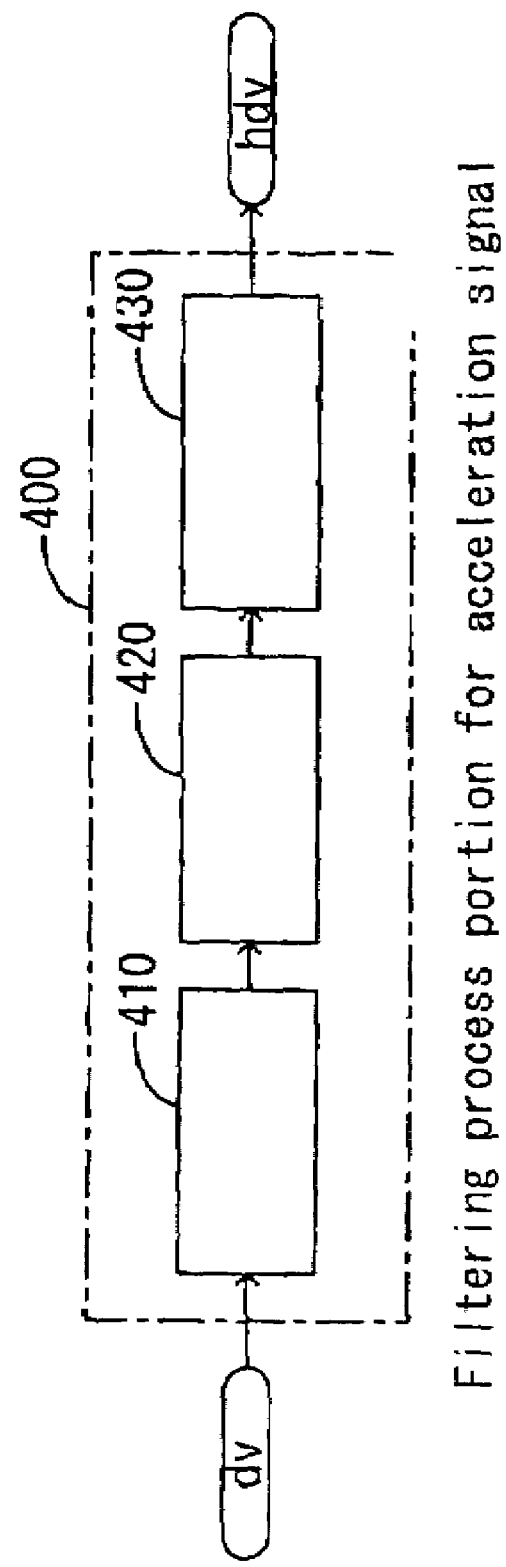
FIG. 13 illustrates a functional block diagram of a filtering portion of an acceleration signal shown in FIG. 9.

As shown in FIG. 13, the filtering process portion of the acceleration signal 400 inputs the acceleration dv for calculating the filtered acceleration hdv thereof by filtering in the same manner of the filtering process portion of the driving signal 200. Specifically, the filtering process portion 400 inputs the acceleration dv into the lowpass filter 410 for eliminating a high frequency noise being more than or equal to the first cut-off frequency f1 included in the acceleration dv. Then, the output from the lowpass filter 410 is input into the notch filter 420. The notch filter 420 eliminates a frequent component between the second cut-off frequency f2 and the third cut-off frequency f3. The notch filter 420 is used for eliminating a component influenced from the twist generated at the transmission of the vehicle and vibration component (fluctuation component) due to the vibration of the suspension of the vehicle.

Next, the output from the notch filter 420 is input into the highpass filter 430. The highpass filter 430 eliminates a frequent component equal to or less than the forth cut-off frequent f4. The highpass filter 430 is used for eliminating an effect from the slope of the load θ. Through such operations, the filtered acceleration hdv is obtained at the filtering process portion of the driving signal 400. The second cut-off frequency f2 may be lager than the first cut-off frequency f1 or the third cut-off frequency f3 may be smaller than the forth cut-off frequency f4 depending on the vehicle type. In this case, the lowpass filter 410 or the highpass filter 430 may be used in place of the notch filter 420.

Figure 14:
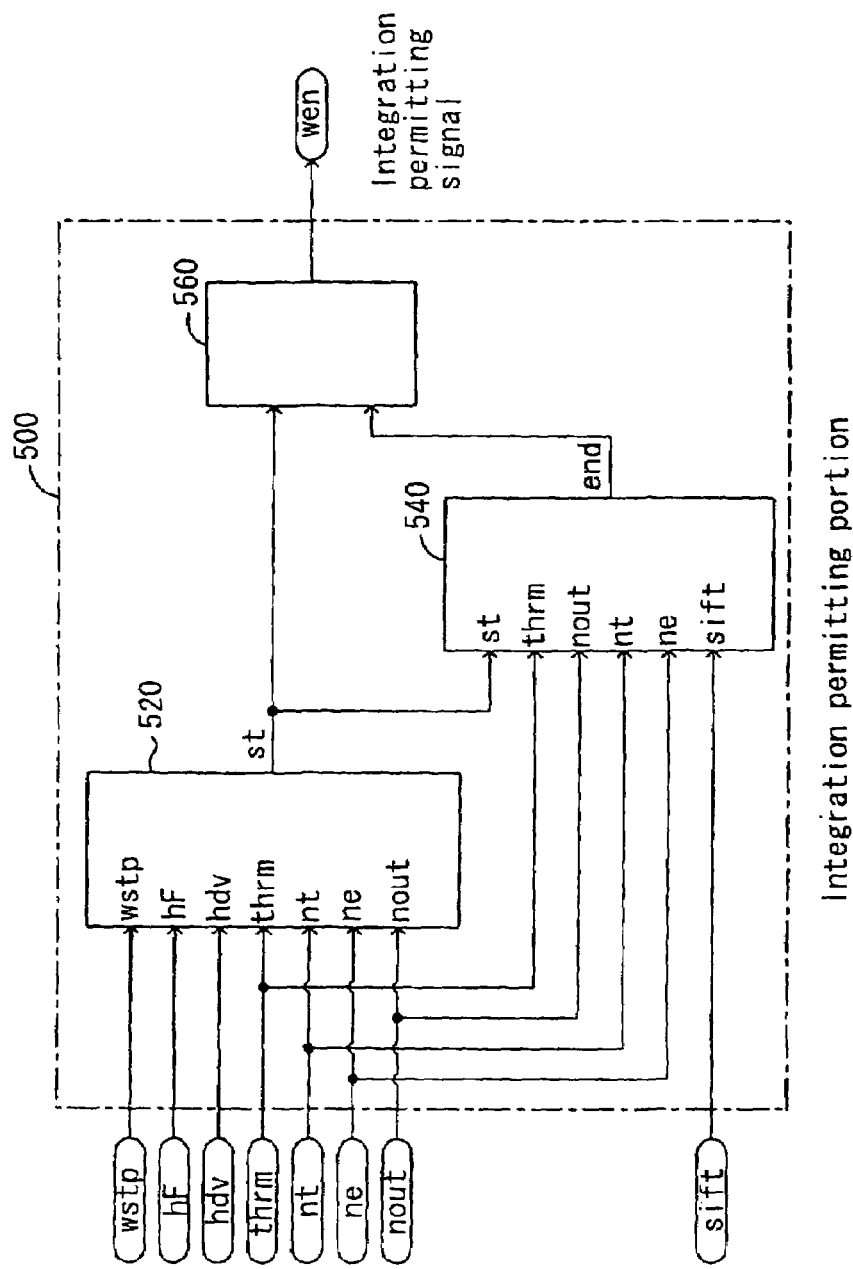
FIG. 14 illustrates a functional block diagram of an integration permitting portion shown in FIG. 9.

The integration permitting portion 500 determines the integration period (the integration starting timing t1 and the integration ending timing t2) at the estimating principle of the vehicle weight. As shown in FIG. 14, the integration permitting portion 500 includes an integration starting timing determining portion 520 for changing the value of an integration starting signal st from "0" to "1" after the condition which the vehicle starts traveling is detected, an integration ending timing determining portion 540 for changing the value of an integration ending signal end from "0" to "1" after it is detected that the speed ration e becomes the peak value, and an exclusive logical addition portion 560.

Figure 15:
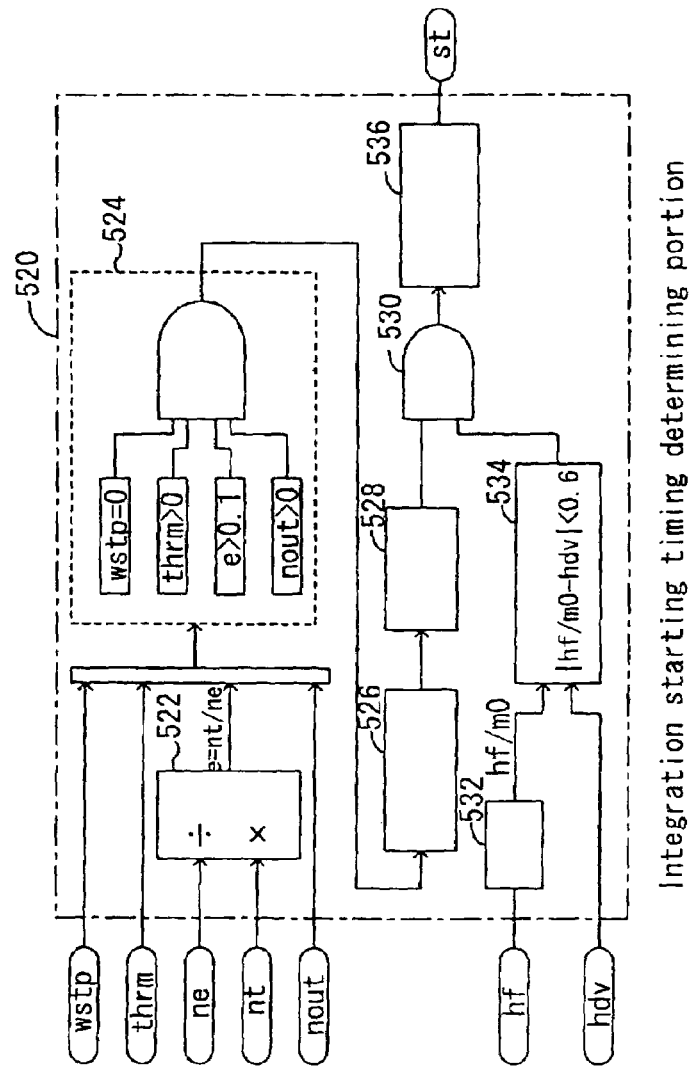
FIG. 15 illustrates a functional block diagram of an integration starting timing determining portion shown in FIG. 14.

As shown in FIG. 15, the integration starting timing determining portion 520 firstly inputs the engine rotation speed ne and the turbine rotation speed nt into a division portion 522 with respect to each predetermine time and calculates the speed ratio e (e=nt/ne). Then, the brake operating signal wstp, the throttle valve opening thrm, the speed ratio e and the output shaft rotation speed nout are input into a logical determining portion for determining whether or not the following conditions are all true.

The brake is not actuated. (wstp=0)

The throttle valve is more than "0". (thrm>0)

The speed ratio e is more than a predetermined value. (e.g. e>0.1)

The vehicle speed is more than "0". (nout>0)

If aforementioned conditions are all true, a signal (e.g. flag) is changed from "0" (L) to "1" (H) for indicating these conditions are all true (the vehicle starts moving). Thus, the logical determining portion 524 includes a starting condition determining means for determining whether or not the vehicle starts moving.

Then, a rising edge detecting portion 526 detects the signal from the logical determining portion 524 being raised from "0" to "1". The detected rising edge is delayed at a delaying portion 528 for a predetermined delaying time TD (e.g. 180 msec), then the signal is output into a logical multiplying portion 530. The integration starting timing (integration starting allowable timing) is delayed for the delaying time TD from the timing when the speed ratio e is lager than a predetermined value (e.g. 0.1) (the timing when the signal from the logical determining portion 524 is changed from "0" to "1") by the delaying portion 528 because the filtering processes of the filtering process portion of the driving signal 200 and the filtering process portion of the acceleration 400 needs a time being equivalent with the delaying time TD. Without the delaying time TD, the filtered acceleration hdv is integrated before the some effects due to the load slope are not eliminated, so that the estimating accuracy of the vehicle weight m may be decreased.

The CPU obtains the value hf/m0 by dividing the filtered driving force hf by the basic vehicle weight m0 at a converting portion 532, then the value hf/m0 is compared to the filtered acceleration hdv at a comparing portion 534. Then the CPU determines whether or not an absolute value between the value hf/m0 and the filtered acceleration hdv (|hf/m0·hdv|) is smaller than a predetermined value (e.g. 0.6). If it is true, a signal (e.g. condition flag) is raised from "0" to "1".

The logical multiplying portion 530 inputs the signals from the delaying portion 528 and the comparing portion 534, and a logical multiplication of these signals is output into a rising edge retaining portion 536. The rising edge retaining portion 536 detects the rising edge of the output signal of the logical multiplying portion 530, then set "1" to the integration starting signal st as an output.

In this way, the integration starting timing determining portion 520 determines at the logical determining portion 524 whether or not the condition of the vehicle being start state, specifically, whether or not the speed ratio e becomes lager than, for example, 0.1. If the logical determining portion 524 determines that the vehicle starts traveling, the integration starting timing determining portion 520 permits to start the integration. The integration starting timing determining portion 520 determines at the comparing portion 534 whether or not the filtered acceleration hdv becomes equal to the value (hf/m0) calculated by dividing the filtered acceleration hf by the basic vehicle weight m0. If the filtered acceleration hdv equals to the value hf/m0, then the integration starting signal st is set to be "1" for permitting to start the integration.

Figure 16:
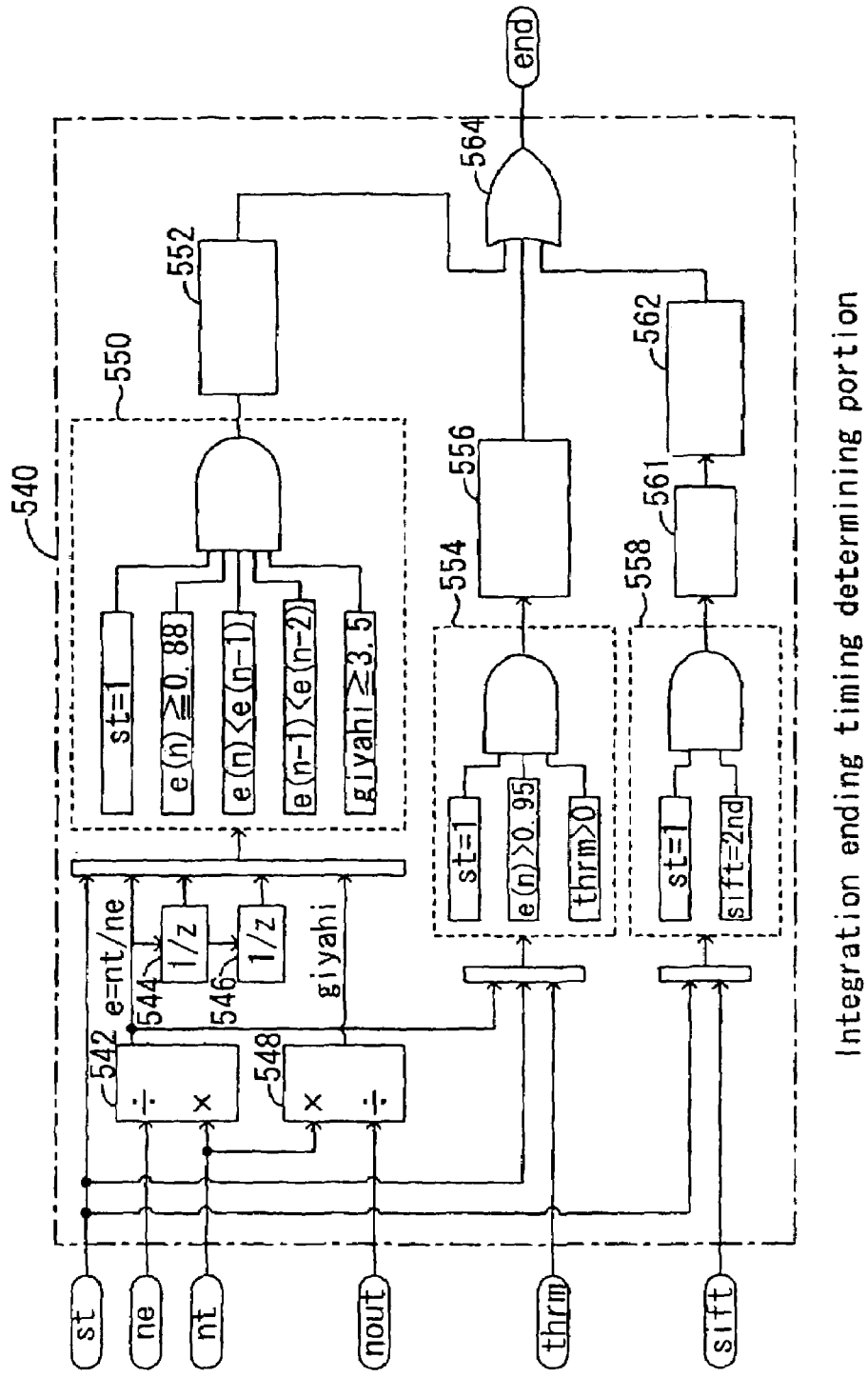
FIG. 16 illustrates a functional block diagram of an integration ending timing determining portion shown in FIG. 14.

On the other hand, in the integration ending timing determining portion 540 shown in FIG. 16, a dividing portion 542 firstly inputs the engine rotation speed ne and the turbine rotation speed nt with respect to each predetermined time ts for calculating the speed ratio e (e=nt/ne). Then, a retaining portion 544 retains the speed ratio e of the predetermined time ts before (previous value), and a retaining portion 546 retains the speed ratio e of the predetermined time ts further before (last but one value). The integration ending timing determining portion 540 inputs the turbine rotation speed nt and the output shaft rotation speed nout at a dividing portion 548 with respect to each predetermined time ts, and calculates a gear ratio giyahi (giyahi=nt/nout).

The integration ending timing determining portion 540 inputs the integration starting signal st, the current speed ratio e (n), the previous speed ratio (n·1), the last but one speed ratio (n·2) and the gear ration giyahi. Then, the integration ending timing determining portion 540 determines whether or not the following conditions are all true.

The integration has already started. (st=1)

The current speed ratio e (n) is equal to or more than a first predetermined threshold. (e.g. >=0.88)

The current speed ratio is smaller than the previous speed ratio. (e(n)<e(n·1))

The previous speed ratio is smaller than the last but one speed ratio. (e(n·1)<e(n·2))

The gear ratio is equivalent to a gear ratio at which the shift range is in the first shift. (giyahi>3.5)

If the aforementioned conditions are all true, a signal (e.g. condition flag) is raised from being "0" to "1" for indicating that the aforementioned conditions are all true. A rising edge retaining portion 552 detects a rising edge of the output signal from the logical determining portion 550, at the same time, the output becomes "1".

By detecting that the current speed ratio e(n) is smaller than the previous speed ratio e(n·1), and the previous speed ratio e(n·1) is smaller than the last but one speed ratio e(n·2) at the logical determining portion 550 (in other words, it is determined that the speed ratio continuously declines at two sampling timings), it is confirmed that the speed ratio becomes the peak value. Thus, the logical determining portion 550 includes a speed ratio peak determining means. The condition e (n)>0.88 (the speed ratio e (n) is lager than the predetermined value) is for correctly determining that the speed ratio e becomes peak even if the two times declination is happened due to noise when the sped ratio e is equal to or less than the first predetermined threshold. In addition, the condition that the gear ratio giyahi is equal to or more than the predetermined value is for making the detection of the peak value effective only when the shift range is in the first shift.

In addition, the integration ending timing determining portion 540 includes a logical determining portion 554. The logical determining portion 554 ends the integration when the peak value of the speed ratio e cannot be detected at the logical determining portion 550 for some reasons. The logical determining portion 554 inputs the integration starting signal st, the current speed ratio e (n) and the throttle valve opening thrm, and determines whether or not the following conditions are all true.

The integration has been started. (st=1)
The current speed ratio e (n) is equal to or more than a second predetermined threshold being larger than the first predetermined threshold. (a value at which the speed ratio e is in a saturated state, e.g. 0.95)
The throttle valve is not full closed. (thrm>0)

If the aforementioned conditions are all true, the logical determining portion 554 raises a signal (e.g. condition flag) from being "0" to "1" for indicating the aforementioned conditions are all true. A rising edge holding portion 556 detects the rising edge of the output signal of the logical determining portion, at this point, the output becomes "1".

Furthermore, the integration ending timing determining portion 540 includes a logical determining portion 558. The logical determining portion 558 inputs the integration starting signal st and the shift range signal sift for determining whether or not the integration has been started (st=1), and the shift range signal sift indicating the second shift. If the aforementioned conditions are all true, a signal (condition flag) is raised from being "0" to "1" (high level) for indicating such conditions are all true. A delaying portion 561 delays the high level signal of the logical determining portion 558 for a predetermined time TH (e.g. 500 msec), and a rising edge holding portion 562 detects a rising edge of the output signal being delayed at the delaying portion 561. At this moment, the output is changed from being "0" to "1".

Each output from a rising edge holding portion 552, 556 and a rising edge detecting portion 562 are input into a logical adding portion 564. Thus, if one of such input signals becomes "1", the logical adding portion 564 changes the integration ending signal end from "0" to "1" and instructs the area comparing portion 600 to ends the integration.

The logical determining portion 558 is provided for surely finishing the integration when the shift range is changed to the second shift. The delaying process at the delaying portion 561 is done for preventing that the integration is finished too early because a sufficient period of time is required between the time when the shift range signal of the first shift is changed to the second shift and the time when the actual shift range is changed to the second shift.

The integration starting signal st determined at the integration starting timing determining portion 520 and the integration ending signal end determined at the integration ending timing determining portion 540 are input into the exclusive logical addition portion 560. The exclusive logical addition portion 560 changes an integration permitting signal wen into "1" when either one of the integration starting signal st or the integration ending signal end is "1", in other cases, the integration permitting signal wen is maintained at "0".

(Area Comparing Portion)

Figure 17:
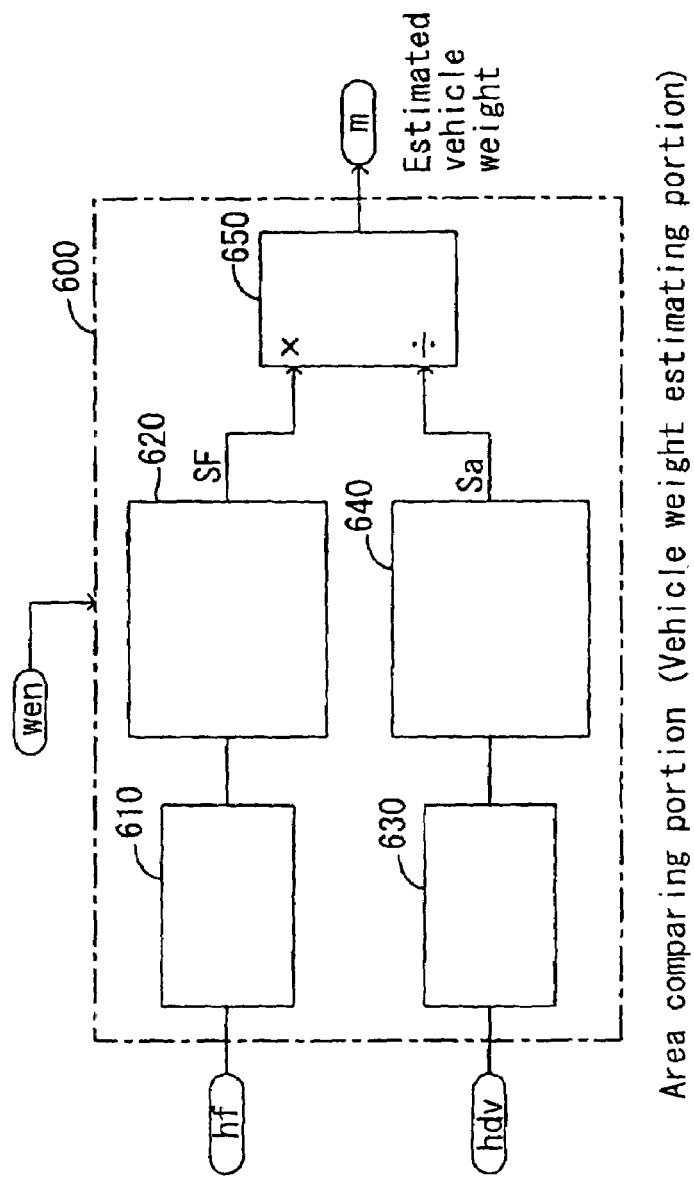
FIG. 17 illustrates a functional block diagram of an area comparing portion shown in FIG. 9.
Figure 18:
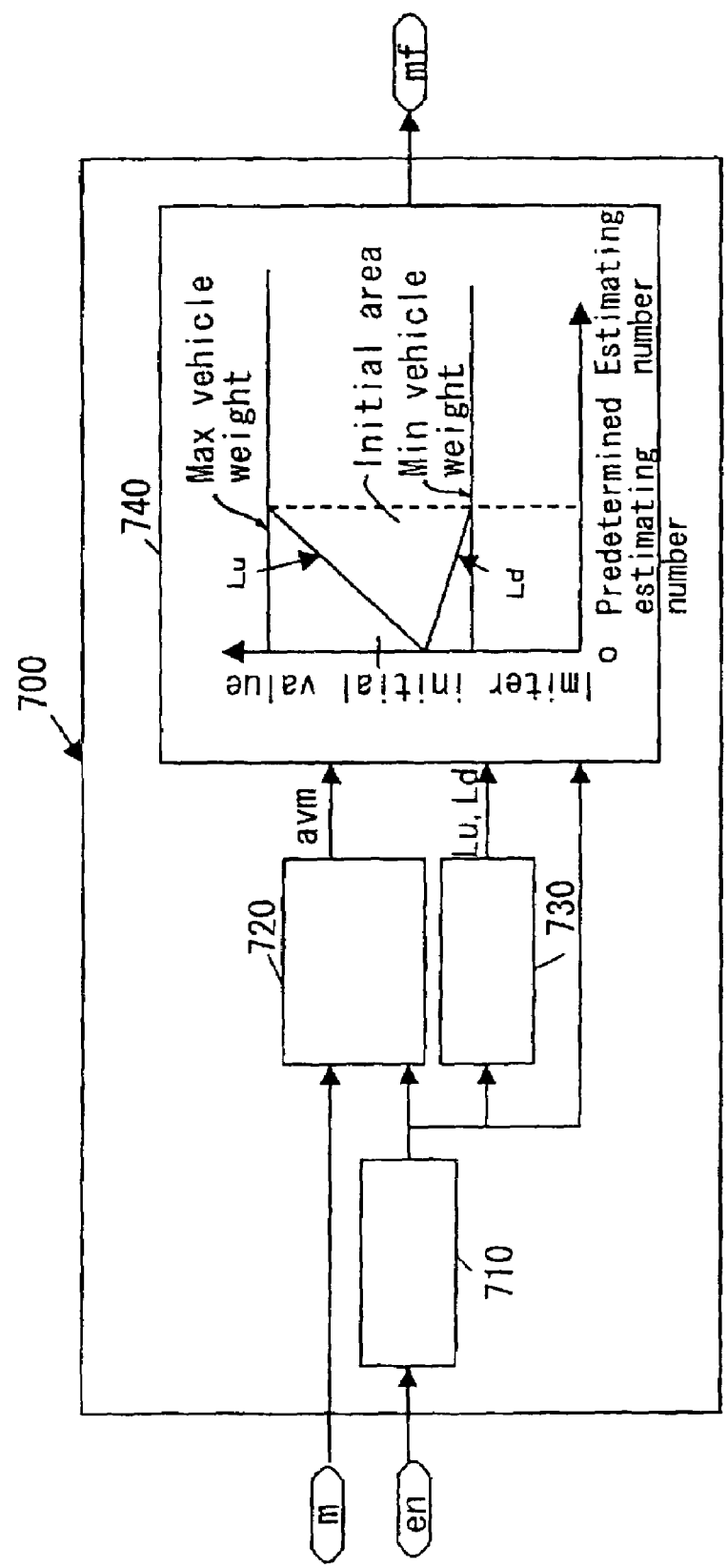
FIG. 18 illustrates a functional block diagram of an estimated vehicle weight limiter portion for obtaining a stable estimated vehicle weight from the estimated vehicle weight shown in FIG. 17.

The area comparing portion 600 shown in FIG. 17 estimates the vehicle weight m by integrating the filtered driving force hf and the filtered acceleration hdv based on the formula 8. Specifically, the area comparing portion 600 calculates an absolute value |hf| of the filtered driving force at an absolute value calculating portion 610, then outputs the absolute value |hf| to an integration calculating portion 620. The integration calculating portion 620 integrates the absolute value |hf| of the filtered driving force hf based on the formula 8. In this case, the integration starting timing t1 is a timing when the integration permitting signal wen is changed from "0" to "1", and the integration ending timing t2 is a timing when the integration permitting signal wen is changed from "1" to "0". Actually, the integration calculating portion 620 calculates a new integration S by multiplying the integration S obtained so far with respect to each the sampling timing by the forgetting coefficient number A and adding the absolute value of the filtered driving force obtained at the current sampling. Thus, a value being equivalent to a driving force integration SF can be calculated by multiplying the integration S by the sampling cycle (T=ts).

The area comparing portion 600 also executes such operation to the filtered acceleration hdv. Specifically, the area comparing portion 600 calculates an absolute value |hdv| of the filtered acceleration hdv at the absolute value calculating portion 630, then calculates a acceleration integration Sa by integrating the absolute value |hdv| based on the right side of the formula 8 at the integration calculating portion 640. In this case, the integration starting timing t1 is a timing when the integration permitting signal wen is changed from "0" to "1", and the integration ending timing t2 is a timing when the integration permitting signal wen is changed from "1" to "0". Actually, the integration calculating portion 640 calculates a new integration S by multiplying the integration S obtained so far with respect to each the sampling timing by the forgetting coefficient number A and by adding the absolute value of the filtered acceleration obtained at the current sampling. Then, a value being equivalent to the acceleration integration Sa can be calculated by multiplying the integration S by the sampling cycle (T=ts).

The area comparing portion 600 calculates the vehicle weight m (SF/Sa) as the estimated vehicle weight by dividing the driving force integration SF by the acceleration integration Sa at the division portion 650 at the integration ending timing t2 (or at any point on and after the integration ending timing t2).

Based on such vehicle weight m calculated by the aforementioned means, an ultimate vehicle weight mf is set at a vehicle weight setting portion 700. Firstly, an estimating number and the vehicle weight m are input into the vehicle weight setting portion 700. Then the vehicle weight m is input into an averaging portion 720, and the estimating number is also input into the averaging portion 720 through an estimating number input portion 710. The vehicle weight m is averaged at the averaging portion 720. In this case, as the estimating number used for calculating the ultimate vehicle weight (estimated vehicle weight), an en signal (enable signal) being "1" when the vehicle weight is estimated or being "0" when the vehicle weight is not estimated is output from the CPU and input into the estimating number input portion 710. According to the embodiment of the current invention, the en signal input into the estimating number input portion 710 is counted inside the estimating number input portion 710. It is determined whether or not a limiter process is done during an initial estimating period depending on the number that the en signal being "1" is input into the predetermined number input portion 710. Specifically, during the initial estimating period that the estimating number has been less than, for example, five times of the predetermined estimating number, the limiter process will be started, however, the limiter process will not be done during a period that the estimating number has been equal to or more than five times. On the other hand, an upper limiter Lu and a lower limiter Ld are determined at a limiter determining portion 730, and the ultimate vehicle weight mf is calculated at a vehicle weight correcting portion 740 by executing limiter correction relative to an averaged estimated vehicle weight avm.

The aforementioned limiter determining portion 730 determines the upper limiter Lu and the lower limiter Ld on a basis of a limiter initial value. On the other hand, the averaged estimated vehicle weight avm is calculated at the averaging portion 720, then the averaged estimated vehicle weight avm is corrected by the upper limiter Lu and the lower limiter Ld at the vehicle weight correcting portion 740. In this case, during a period from the time from the beginning of the vehicle estimation until the number of the estimation becomes the predetermined number (e.g. five times) (during a period when the initial estimation is done), there is a little data of the estimated vehicle weight m memorized in the memory (RAM). If the vehicle weight mf is calculated based on insufficient data, a particularity of the data may be generated, so that such data needs to be limited to prevent such particularity.

In the embodiment of the current invention, during the initial estimating period soon after the estimation of the vehicle weight is started, the averaged vehicle weight avm is calculated until the estimating number becomes the predetermined number (five times) by calculating the vehicle weight estimation at the predetermined cycle. Thus, moving average is obtained based on the estimated vehicle weight avm for every predetermined number of a predetermined times (e.g. 8 times). Specifically, an area for memorizing the data of the estimated vehicle weight m for eight times prior to the current data (the newest estimated vehicle weight m) in chronological order and an area for memorizing the data of the averaged estimated vehicle weight avm for eight times of the estimated vehicle weight m are served in the memory. In this configuration, when the averaged estimated vehicle weight avm is calculated, the oldest estimated vehicle weight m the eight times prior to the newest data is deleted and renewed from the new data sequentially.

$$avm = \sum_{i=1}^{n} mi/n \text{ (e.g. } n = 8\text{)} \qquad \text{Formula 9}$$

Figure 19:
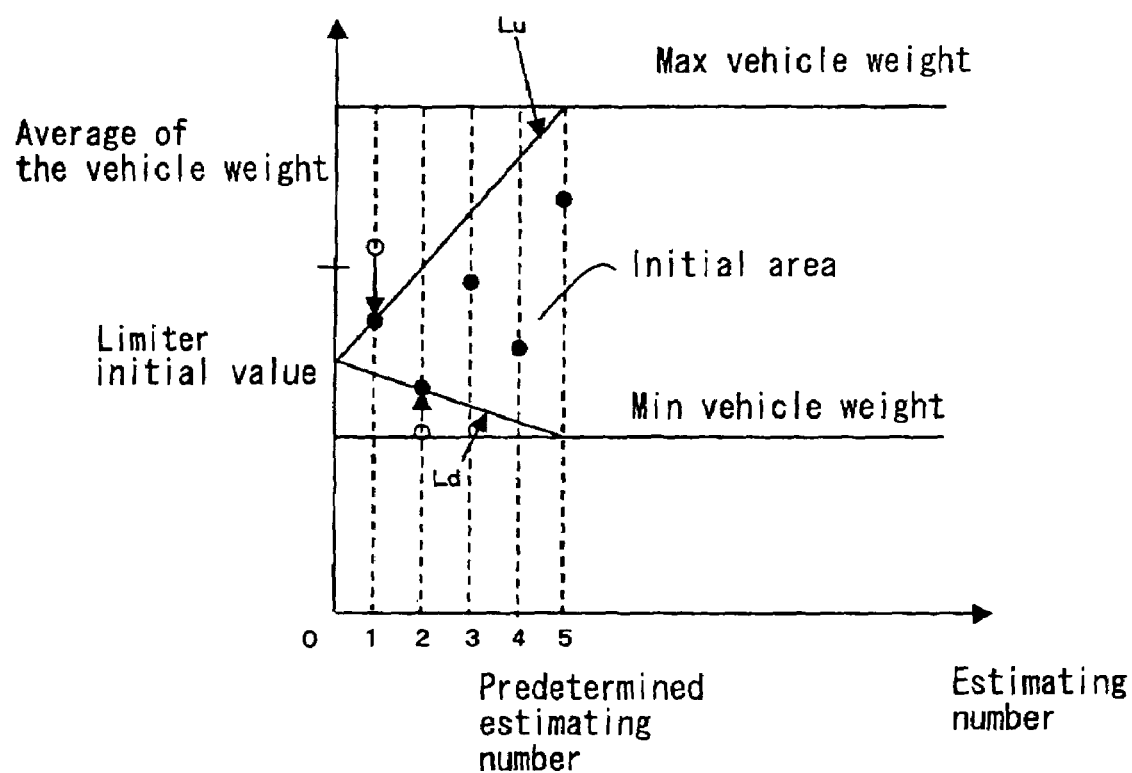
FIG. 19 illustrates a graph explaining a vehicle weight limiter portion shown in FIG. 18 based on an estimating number and an estimated weight average value.

In the embodiment of the current invention, an initial area is set at the initial estimation as shown in FIG. 19 for improving a reliability of the initial weight estimation. In this case, when the estimating number becomes the predetermined number, the number of data becomes sufficient, so that the estimated vehicle weight m obtained by the CPU becomes reliable. In other words, when the number to obtain the averaged estimated vehicle weight avm based on the estimated vehicle weight is less than the predetermined estimating number (e.g. 5 times), the data is limited by correcting the averaged estimated vehicle weight avm. Then, when the vehicle weight estimating number becomes equal to or more than the predetermined estimating number, the number of the data is increased comparing to the number of the data during the initial estimation period, so that the estimated vehicle weight mf becomes more reliable. Thus, the number of the data during a period when the estimating number of the averaged estimated vehicle weight avm is less than the predetermined estimating number is smaller than the number of the data during a period when the estimating number of the averaged estimated vehicle weight avm is equal to or more than the predetermined estimating number, and such insufficient data may cause the less reliability. To avoid such problem, a means for correcting the averaged vehicle weight avm is adopted in the embodiment of the current invention, wherein the averaged vehicle weight avm is controlled to be within the predetermined initial area during a initial estimating period from the beginning of the weight estimation until the estimating number becomes the predetermined estimating number.

A calculating method of the vehicle weight mf during the initial estimating period will be explained as follows. Firstly, a vehicle weight maximum value mmax of a vehicle being maximum loading and a vehicle weight minimum value mmin of the vehicle being empty are set. In addition, a vehicle weight intermediate value mc being between the vehicle weight maximum value mmax and the vehicle weight minimum value mmin is set for setting an initial value of a off set. The initial value of the off set value is set between the vehicle weight intermediate value mc and the vehicle weight minimum value mmin to prevent an excessive engine braking on the upgrade which may give uncomfortable feeling to the passenger.

As shown in FIG. 19, the initial area is framed by a limiter initial value, the vehicle weight maximum value mmax and the vehicle weight minimum value mmin. During the initial estimating period from the beginning of the estimation start until the estimating number becomes the predetermined estimating number (e.g. 5), an initial estimating area is set to accurately calculate the vehicle weight mf In the initial area, the upper limiter Lu is set based on the filter initial value and the vehicle weight maximum value mmax, and the lower limiter is set based on the filter initial value and the vehicle weight minimum value mmin. The upper limiter and the lower limiter are obtained by the formula 10.

$$Lu=\text{initial value}+(\text{vehicle weight maximum value}-\text{initial value})/\text{estimating number} \qquad \text{Formula 10}$$

$$Ld=\text{initial value}-(\text{initial value}-\text{vehicle weight minimum value})/\text{estimating number}$$

The limiter determining portion 730 calculates the upper limiter Lu and the lower limiter Ld by the aforementioned formula, then the area framed by the limiter initial value, upper limiter Lu and the lower limiter Ld is set as the initial area. Based on the initial area, the limiter correction will be done at the vehicle weight correcting portion 740.

Until the estimating number of the averaged estimating vehicle weight avm becomes the predetermined number (e.g. 5 times), the estimated vehicle weight avm is calculated by moving averaging of the eight estimated vehicle weight m. In this case, the data of the vehicle weight m is sequentially memorized as d1, d2, . . . , dn, and the averaged estimated vehicle weight avm is obtained by following formulas.

| | |
|---|---|
| first estimation | avm1 = d1 |
| second estimation | avm2 = (d1 + d2)/2 |
| third estimation | avm3 = (d1 + d2 + d3)/3 |
| forth estimation | avm4 = (d1 + d2 + d3 + d4)/4 |
| fifth estimation | avm5 = (d1 + d2 + d3 + d4 + d5)/5 |

If the obtained averaged estimated vehicle weight avm is in the initial area framed by the upper limiter Lu and the lower limiter Ld, the averaged estimated vehicle weight avm is set to a corrected vehicle weight mf (in FIG. 19, estimated vehicle weight on and after third estimation). The averaged estimated vehicle value is in the outside of the initial area and larger than the upper limiter Lu, the upper limiter Lu limits the averaged estimated vehicle value to be corrected to the upper limiter Lu obtained by the formula 10. In this way, the vehicle weight mf can be obtained (first estimation in FIG. 19). On the other hand, the averaged estimated vehicle value is in the outside of the initial area and smaller than the lower limiter Ld, the lower limiter Ld limits the averaged estimated vehicle value to be corrected to the lower limiter Ld obtained by the formula 10. In this way, the vehicle weight mf can be obtained (second estimation in FIG. 19).

In this way, during the period of the initial estimation for estimating the vehicle weight, the number of the data stored in the memory of the estimated vehicle weight m is small, however, the reliability of such data can be increased by limiting the value obtained by moving averaging the estimated vehicle weight m by the upper limiter Lu and the lower limiter Ld when the value obtained by moving averaging the estimated vehicle weight m is in the outside of the predetermined initial area. Thus, estimated vehicle weight (filtered estimated vehicle weight mf) can be obtained stably even if the number of the data is not sufficient due to the small estimating number. Such correction referring to the initial area will be canceled after the number of the estimation becomes equal to or larger than the predetermined estimating number because sufficient data will be provided after the number of the estimation becomes equal to or larger than the predetermined estimating number. As aforementioned before, the vehicle weight estimating device according to the embodiment of the current invention firstly obtain the filtered acceleration hdv and the filtered driving force hf, then integrates the absolute value of the filtered acceleration hdv and the filtered driving force hf during the predetermined period. Such integrating period starts when the vehicle starts traveling, and the filtered acceleration hdv is not including much noise (when the filtered acceleration hdv becomes approximately equal to the value determined by the filtered driving force hf (hf/m0)), and ends when the speed ratio e becomes the peak value. Furthermore, the forgetting coefficient number is introduced to the absolute value of the filtered acceleration hdv and the absolute value of the filtered driving force hf are integrated for decreasing the influence of the data having a lot of noise. Thus, estimating accuracy of the vehicle weight can be improved.

In the embodiment of the current invention, the product λ·Cp is integrally obtained as a one map based on the speed ratio e, however, the torque gain λ and the capacity coefficient Cp may be obtained respectively, then the product of such values may be obtained. In addition, the integration starting timing t1 may be set when the output of the logical determining portion 524 is changed from "0" to "1", not calculated at the comparing portion 534. Further, the integration ending timing t2 may be the timing when the speed ratio 2 becomes the peak value, or when the shift range signal sift is changed from a signal indicating the first shift to a signal indicating the second shift, or a timing of a predetermined (constant) time after the integration starting timing t1. Furthermore, the forgetting coefficient number may not be necessary. The value of the forgetting coefficient may be "1".

The initial value used for calculating the filtered estimating vehicle weight mf may be set toward the vehicle weight maximum value mmax side if a heavy estimated value needs to be obtained, and the initial value may be set toward the vehicle weight minimum value mmin side if a light estimated value needs to be obtained.

According to the current invention, a vehicle weight average value is certainly set within a predetermined initial area provided with respect to each vehicle (an area determined depending on the vehicle weight maximum value and the vehicle weight minimum value) even if the estimating number of the vehicle weight is small (for example, enough data is not available when the vehicle weight is estimate at the initial estimation). Thus, the particularity is not appeared, and the weight estimation can be done stably.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. A vehicle weight estimating device comprising;
an acceleration detecting means for detecting an acceleration of a vehicle;
a driving force estimating means for estimating a driving force of the vehicle;
a filtered acceleration obtaining means for obtaining a filtered acceleration by eliminating a low frequency component from the detected acceleration;
a filtered driving force obtaining means for obtaining a filtered driving force by eliminating a low frequency component from the estimated driving force;
an acceleration integrating means for obtaining an acceleration integration by integrating a value corresponding to an absolute value of the filtered acceleration during a predetermined period;
a driving force integrating means for obtaining a driving force integration by integrating a value corresponding to an absolute value of the filtered driving force during the predetermined period;
a vehicle weight estimating means for estimating the vehicle weight based on the acceleration integration and the driving force integration;

a vehicle weight averaging means for inputting the estimated vehicle weight and an estimating number of the vehicle weight and averaging the estimated vehicle weight;

a limiter determining means for setting a limiter initial value, providing an upper limiter and a lower limiter passing the limiter initial value, and setting an initial area framed by the limiter initial value, the upper limiter and the lower limiter, and a vehicle weight correcting means for correcting the average vehicle weight based on the initial area during an initial estimation of the vehicle weight.

2. A vehicle weight estimating device according to claim 1, wherein the upper limiter is set based on the limiter initial value and a vehicle weight maximum value to which the vehicle can be loaded, and the lower limiter is set based on the limiter initial value and a vehicle weight minimum value to which the vehicle can be unloaded.

3. A vehicle weight estimating device according to claim 1, wherein the averaged vehicle weight is corrected by the upper limiter or the lower limiter when the averaged vehicle weight is out of the initial area during the initial estimation.

4. A vehicle weight estimating device according to claim 1, wherein the correction of the averaged vehicle weight based on the initial area is canceled after the estimating number becomes a predetermined estimating number.

5. A vehicle weight estimating device according to claim 1, wherein the initial estimation is executed within a period from the beginning of vehicle weight estimation until the estimating number becomes the a predetermined estimating number.

6. A vehicle weight estimating device according to claim 1, wherein the averaged vehicle weight is corrected so as to get in the initial area.

7. A vehicle weight estimating device according to claim 1, wherein the initial value is set based on a vehicle weight maximum value and a vehicle weight minimum value.

8. A vehicle weight estimating device according to claim 7, wherein the vehicle weight maximum value is a vehicle weight of the vehicle being maximum loading, the vehicle weight minimum value is a vehicle weight of the vehicle being empty.

9. A vehicle weight estimating device according to claim 1, wherein the initial value is set between a vehicle weight intermediate value, which is between a vehicle weight maximum value, and a vehicle weight minimum value and the vehicle weight minimum value.

* * * * *